United States Patent
Hana et al.

(10) Patent No.: US 12,135,207 B2
(45) Date of Patent: Nov. 5, 2024

(54) INSPECTION DEVICE FOR ROTATING ELECTRICAL MACHINES AND METHOD FOR INSPECTING ROTATING ELECTRICAL MACHINES

(71) Applicant: Mitsubishi Generator Co., Ltd., Hyogo (JP)

(72) Inventors: Norihiko Hana, Tokyo (JP); Masao Akiyoshi, Tokyo (JP); Daichi Goto, Tokyo (JP); Kazuaki Ogura, Tokyo (JP)

(73) Assignee: MITSUBISHI GENERATOR CO., LTD., Kobe (JP)

( * ) Notice: Subject to any disclaimer, the term of this patent is extended or adjusted under 35 U.S.C. 154(b) by 298 days.

(21) Appl. No.: 17/637,463

(22) PCT Filed: Dec. 19, 2019

(86) PCT No.: PCT/JP2019/049829
§ 371 (c)(1),
(2) Date: Feb. 23, 2022

(87) PCT Pub. No.: WO2021/124515
PCT Pub. Date: Jun. 24, 2021

(65) Prior Publication Data
US 2022/0276045 A1    Sep. 1, 2022

(51) Int. Cl.
*G01B 21/32*    (2006.01)
*H02K 3/487*    (2006.01)

(52) U.S. Cl.
CPC ............ *G01B 21/32* (2013.01); *H02K 3/487* (2013.01)

(58) Field of Classification Search
CPC ...... G01B 21/32; G01B 11/165; H02K 3/487; H02K 15/00
(Continued)

(56) References Cited

U.S. PATENT DOCUMENTS

| 2011/0301874 A1* | 12/2011 | Reed ............... H02K 15/00 702/41 |
| 2014/0020470 A1 | 1/2014 | Tsutsui et al. |
| 2019/0199179 A1 | 6/2019 | Watanabe et al. |

FOREIGN PATENT DOCUMENTS

| JP | 55-29249 A | 3/1980 |
| JP | 59-165942 A | 9/1984 |

(Continued)

OTHER PUBLICATIONS

International Search Report and Written Opinion mailed on Mar. 10, 2020, received for PCT Application PCT/JP2019/049829, Filed on Dec. 19, 2019, 9 pages including English Translation.

*Primary Examiner* — Robert R Raevis
(74) *Attorney, Agent, or Firm* — XSENSUS LLP

(57) ABSTRACT

This device includes: an input unit for receiving a shape of an inspection target surface of a wedge exposed from a slot with no force applied to the wedge; a relation storage unit which acquires and stores, as a deformation reaction force relation, a relation between a reaction force of a spring at the inspection target surface of the wedge and deformation distribution from the shape of the inspection target surface of the wedge inputted to the input unit; a measurement unit for measuring measurement deformation distribution of the inspection target surface of the wedge; an estimation unit for estimating an estimation reaction force from the measurement deformation distribution and the deformation reaction force relation; and a judgement unit for judging proper/fault about looseness of the wedge from the estimation reaction force.

20 Claims, 20 Drawing Sheets

(58) Field of Classification Search
USPC ........ 73/572, 760, 774, 865.8, 865.9, 432.1;
348/82, 125, 129, 130; 340/635, 679;
322/90
See application file for complete search history.

(56) References Cited

FOREIGN PATENT DOCUMENTS

| | | |
|---|---|---|
| JP | 1-298929 A | 12/1989 |
| JP | 2013-142598 A | 7/2013 |
| JP | 2019-117137 A | 7/2019 |

\* cited by examiner

FIG. 6
FIG. 6A
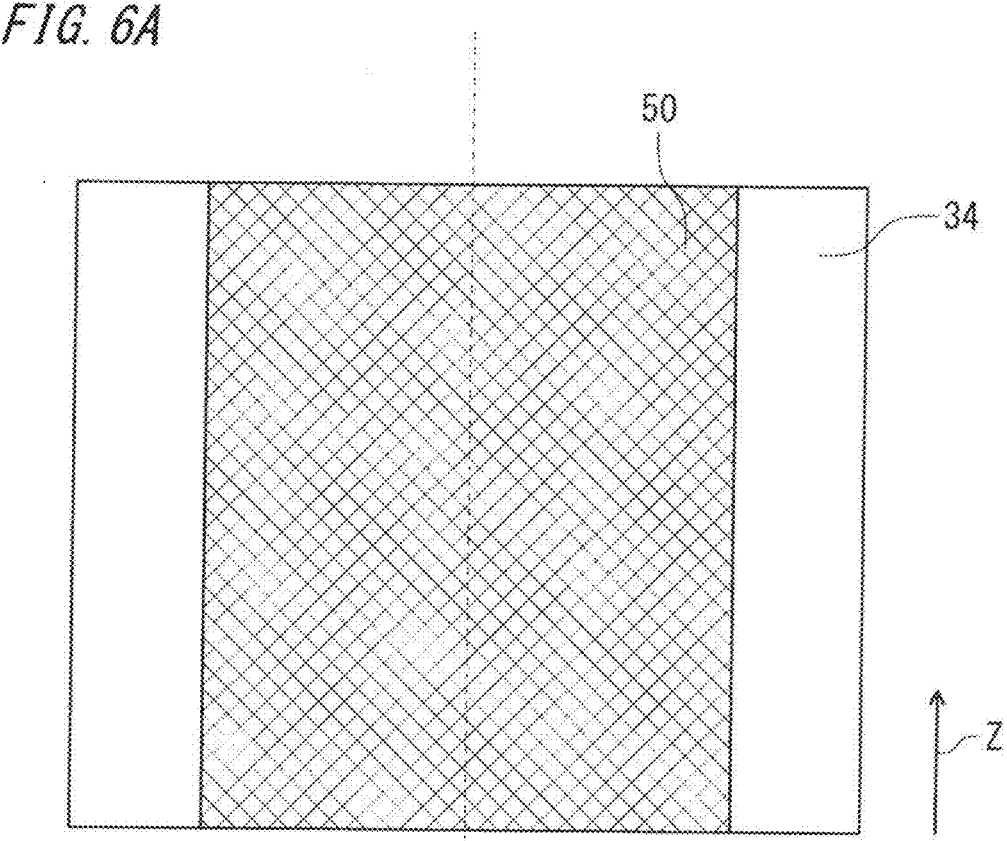
FIG. 6B
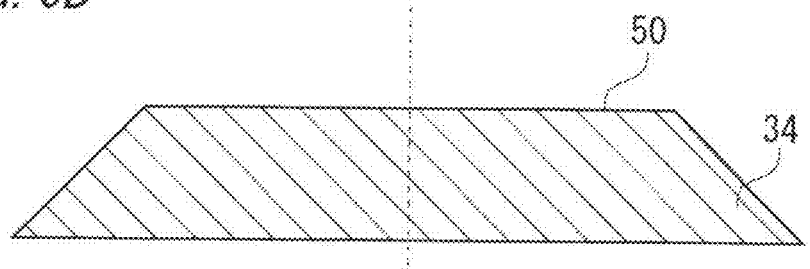

FIG. 11
FIG. 11A
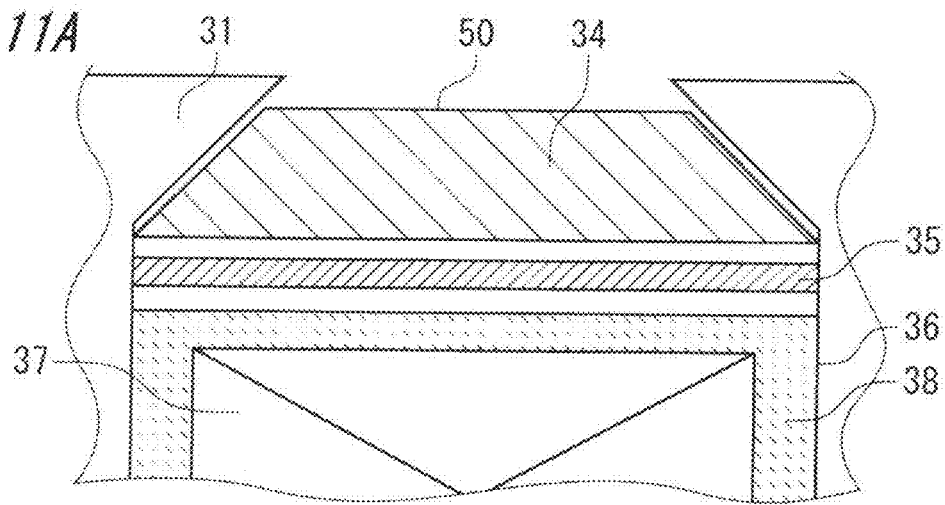
FIG. 11B
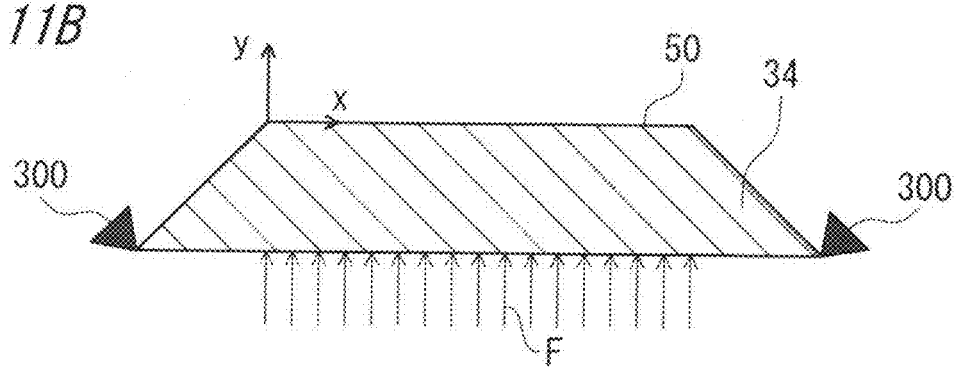
FIG. 11C
(DEFORMATION AMOUNT)
FIG. 11D
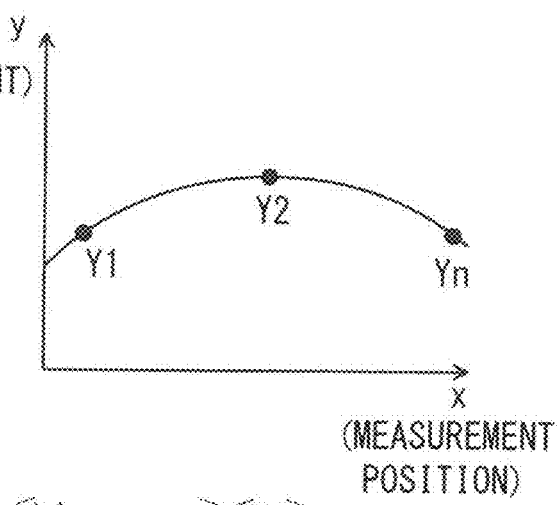

FIG. 12
FIG. 12A
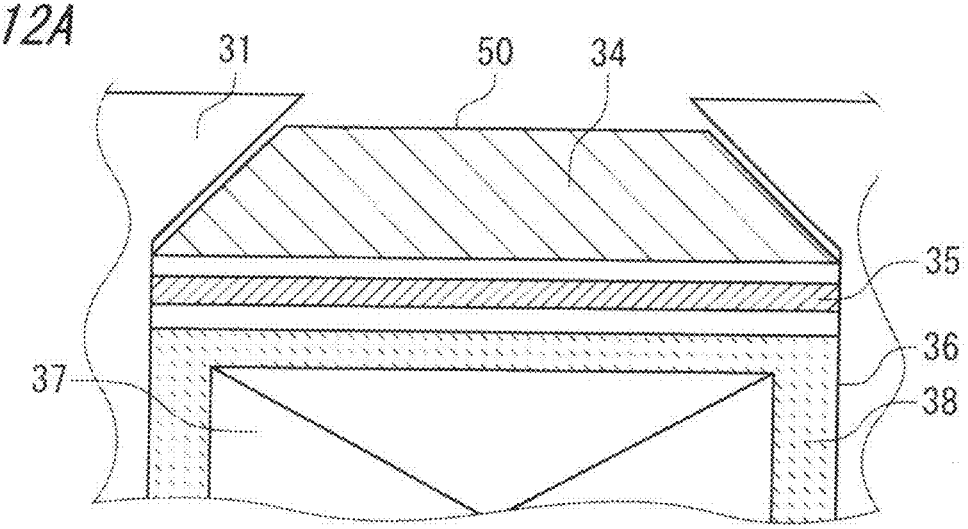
FIG. 12B
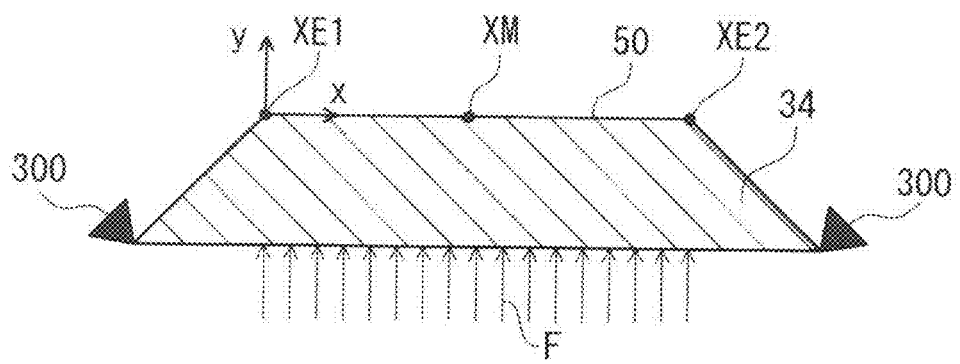
FIG. 12C
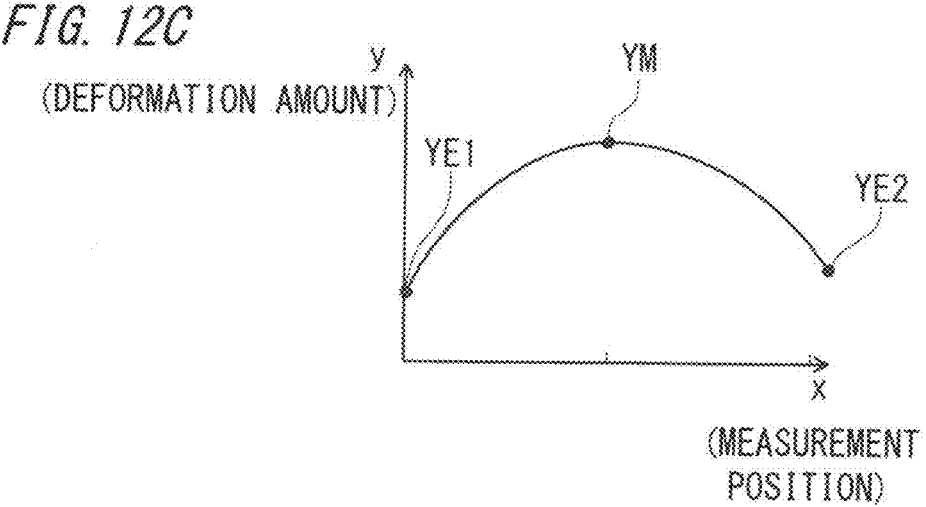

FIG. 15
FIG. 15A
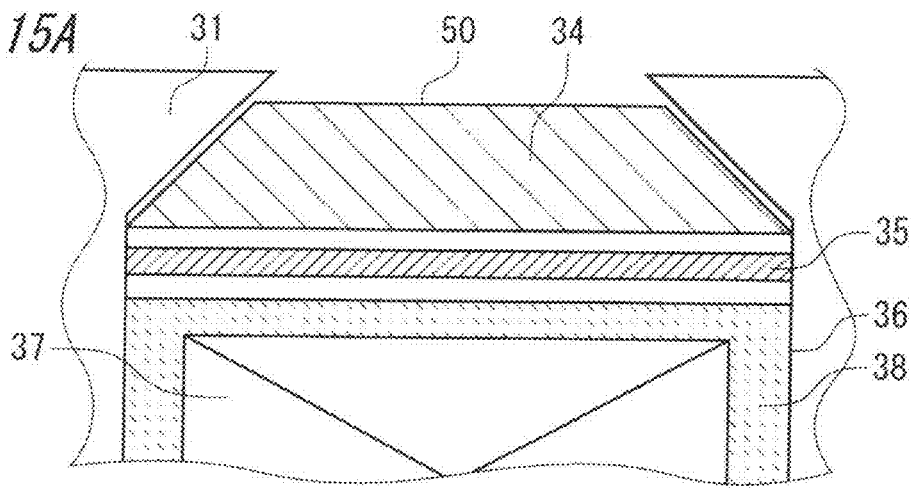
FIG. 15B
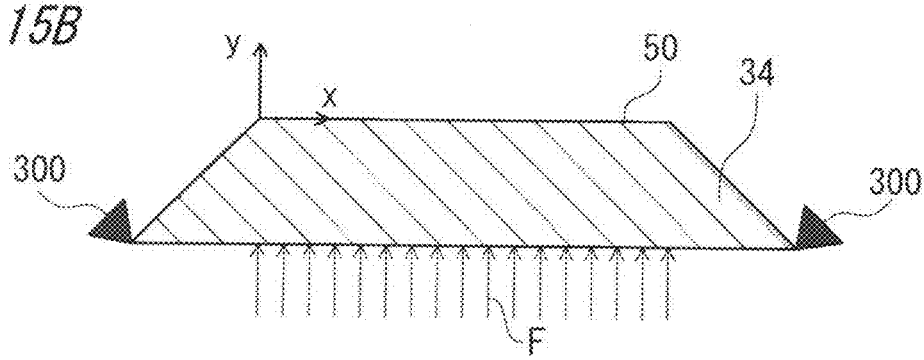
FIG. 15C
(DEFORMATION AMOUNT)
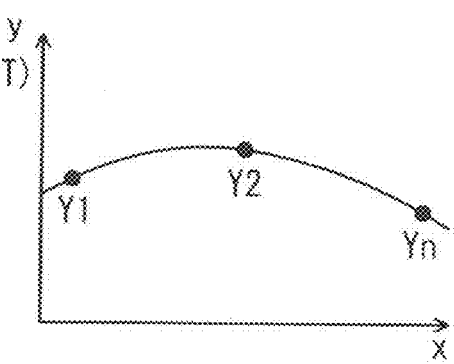
(MEASUREMENT POSITION)
FIG. 15D
$Y = f_m(x)$
$f_m(x)$ = FUNCTION OF DEFORMATION DISTRIBUTION CALCULATED FOR EACH CONTACT LOCATION BETWEEN CORE AND WEDGE
$$F = \begin{bmatrix} km\_1 & & 0 \\ & \ddots & \\ 0 & & km\_n \end{bmatrix} \begin{bmatrix} Y1 \\ \vdots \\ Yn \end{bmatrix}$$

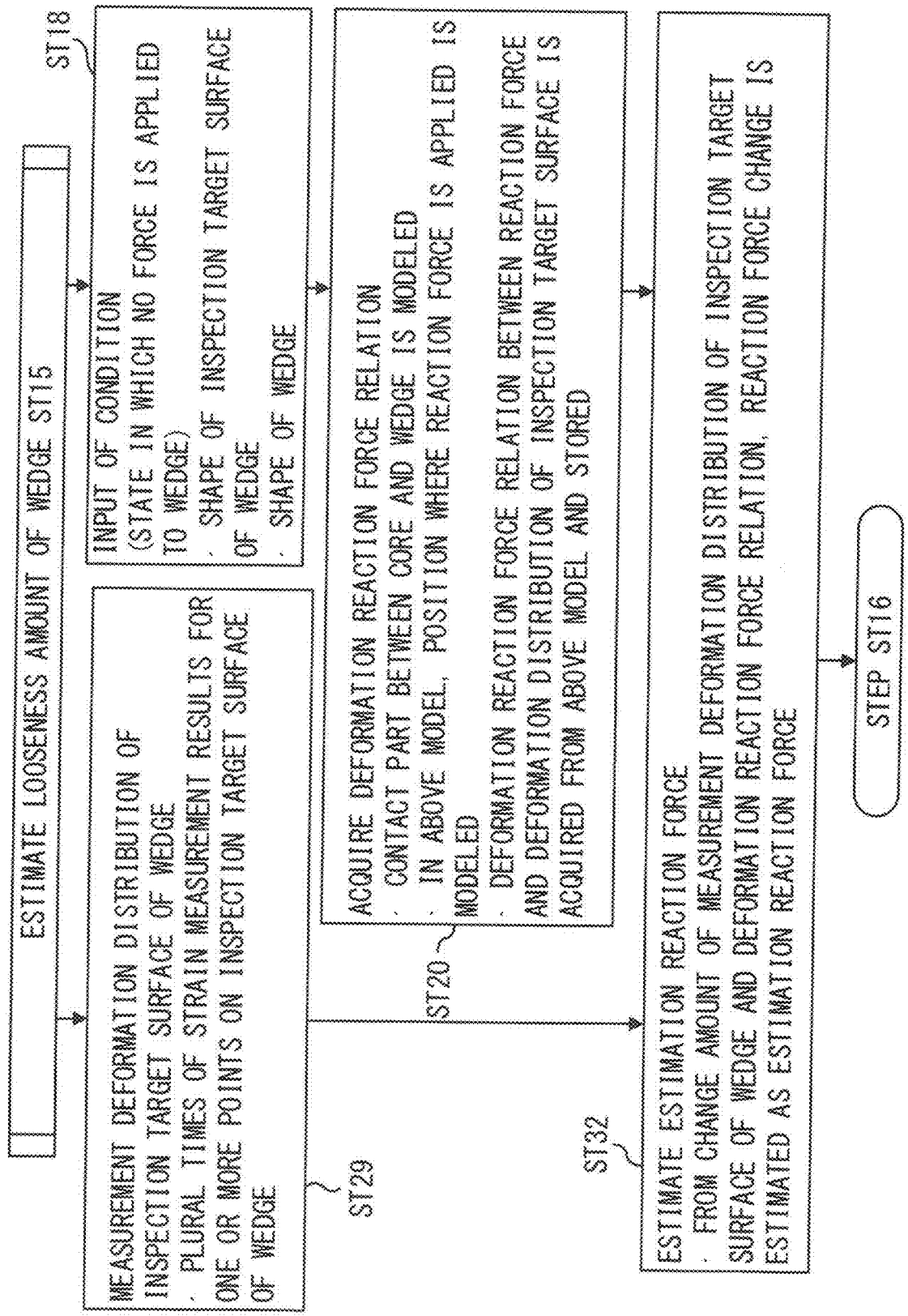

FIG. 17
FIG. 17A
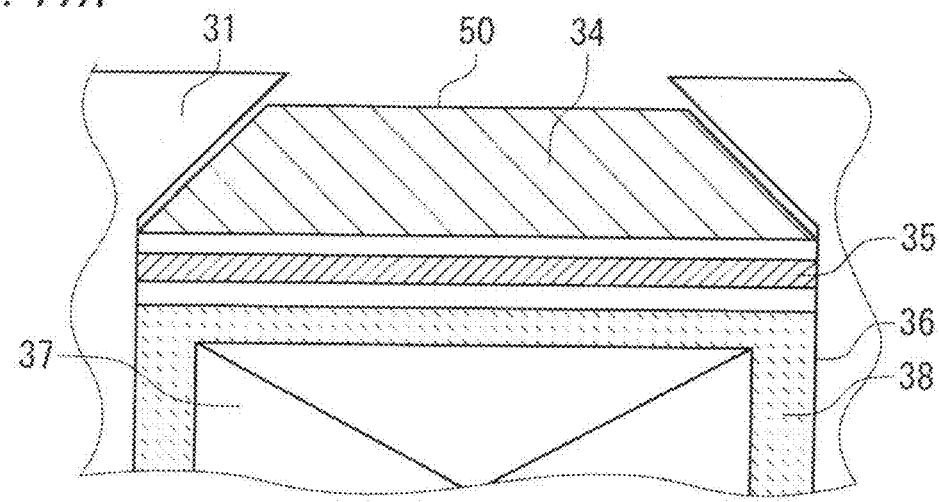
FIG. 17B
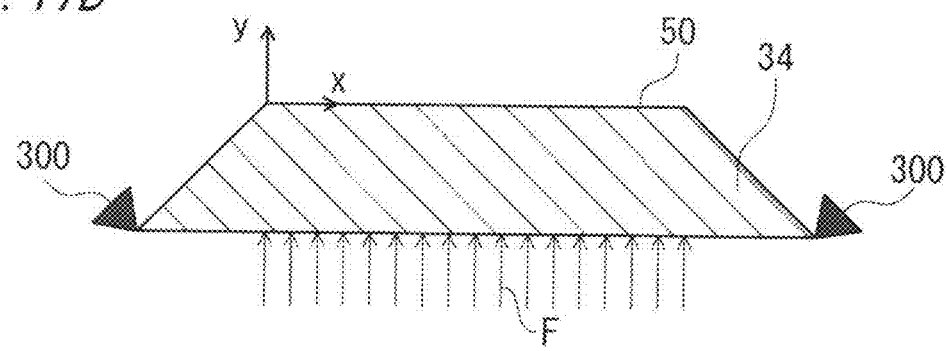
FIG. 17C
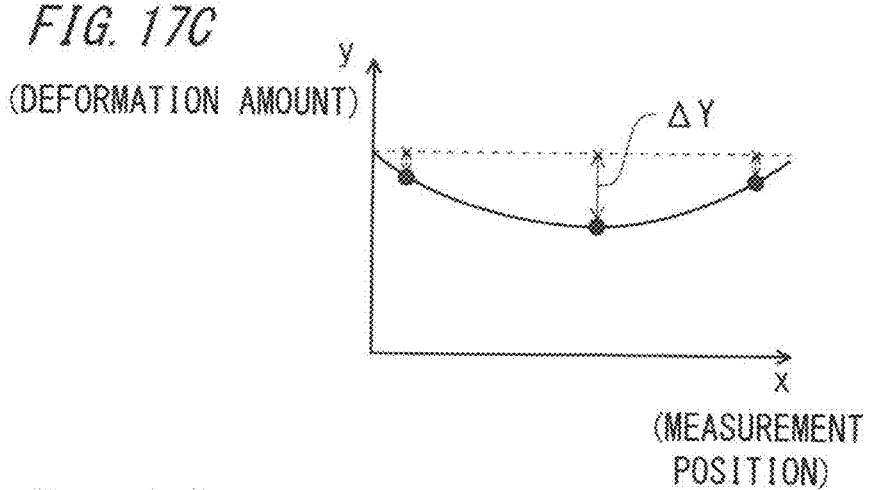
FIG. 17D
$$\Delta F = \begin{bmatrix} k_1 & & 0 \\ & \ddots & \\ 0 & & k_n \end{bmatrix} \begin{bmatrix} \Delta Y_1 \\ \vdots \\ \Delta Y_n \end{bmatrix}$$

FIG. 19
FIG. 19A
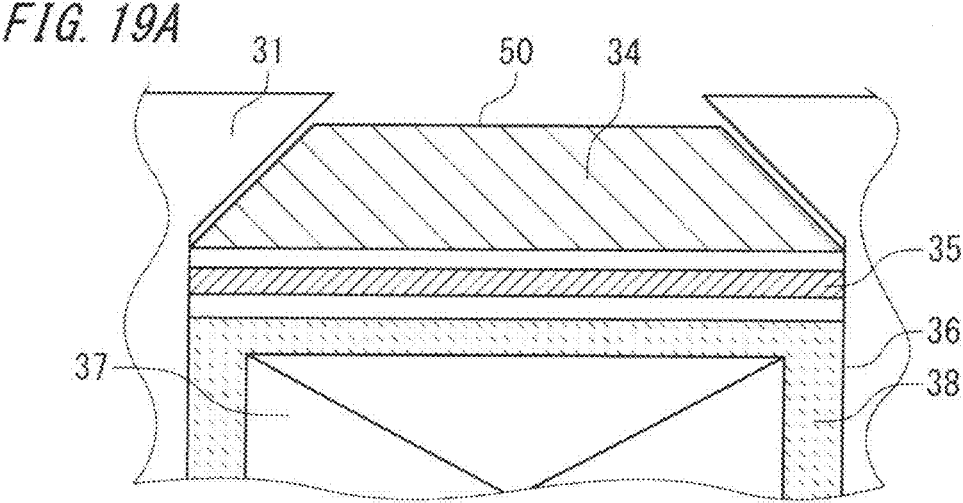
FIG. 19B
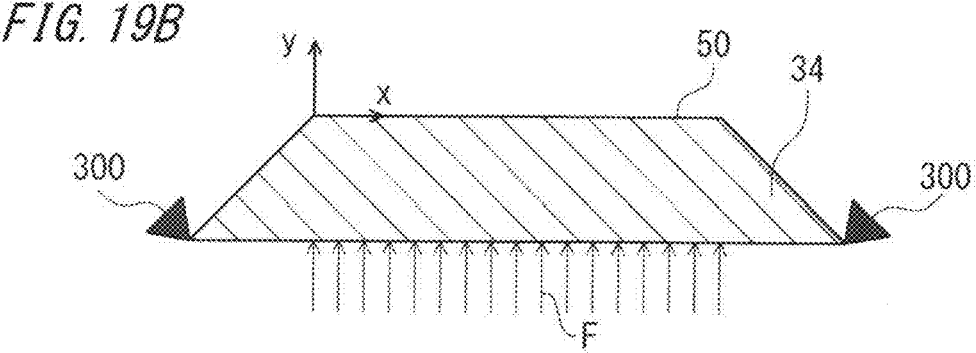
FIG. 19C (DEFORMATION AMOUNT)
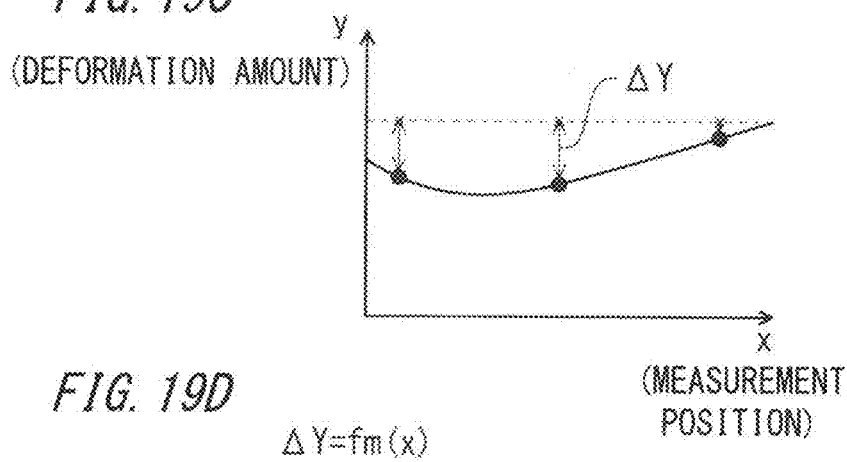
(MEASUREMENT POSITION)
FIG. 19D
$\Delta Y = fm(x)$
$$\Delta F = \begin{bmatrix} km\_1 & & 0 \\ & \ddots & \\ 0 & & km\_n \end{bmatrix} \begin{bmatrix} \Delta Y1 \\ \vdots \\ \Delta Yn \end{bmatrix}$$

INSPECTION DEVICE FOR ROTATING ELECTRICAL MACHINES AND METHOD FOR INSPECTING ROTATING ELECTRICAL MACHINES

CROSS-REFERENCE TO RELATED APPLICATION

The present application is based on PCT filing PCT/JP2019/049829, filed Dec. 19, 2019, the entire contents of which are incorporated herein by reference.

TECHNICAL FIELD

The present disclosure relates to an inspection device for a rotating electrical machine and an inspection method for a rotating electrical machine.

BACKGROUND ART

A retaining structure for a coil of a stator in a rotating electrical machine is formed of a wedge contacting with a stator core so as to prevent a coil from coming off, and a ripple spring provided between the wedge and the coil. The ripple spring is provided for preventing the coil from vibrating due to an electromagnetic excitation force generated at the coil during operation of the rotating electrical machine, and is mounted in a deflected shape so as to generate a certain retaining force. In this retaining structure, as a resin member such as a coil main insulation portion changes in dimensions over time, deflection of the ripple spring is reduced, so that the retaining force is reduced. Therefore, wedge looseness inspection is regularly conducted to monitor the reduction amount of the retaining force of the ripple spring.

As a method for inspecting looseness of a stator wedge due to reduction in the retaining force of the ripple spring, there is a method of measuring a reaction force of the spring through regular inspections to monitor the reduction amount of the reaction force. For example, as shown in Patent Document 1, a wavy coil fixation member formed by an elastic body is provided on a stator coil, a wedge having a monitoring slit at a corresponding position above a topmost wave-crest part of the coil fixation member is provided, and a sensor part of an optical-type displacement detector is placed at a position of a rotor that is opposed to the monitoring slit of the wedge, whereby a spring pressure signal about the coil fixation member during operation can be monitored at all times.

CITATION LIST

Patent Document

Patent Document 1: Japanese Laid-Open Patent Publication No. 01-298929

SUMMARY OF THE INVENTION

Problems to be Solved by the Invention

In the conventional inspection device and method for a rotating electrical machine, the looseness detection sensor is mounted with the wedge or a supporting structure therefor changed, and thus the strength of the wedge or the supporting structure therefor might be reduced.

The present disclosure has been made to solve the above problem, and an object of the present disclosure is to provide an inspection device and an inspection method for a rotating electrical machine that do not need change in structure and can conduct inspection without increase in the number of processing steps.

Solution to the Problems

An inspection device for a rotating electrical machine according to the present disclosure is for inspecting a rotating electrical machine including a stator having a wedge for fixing, with a spring interposed or by having a spring function, a winding placed in a slot formed on an inner side in a radial direction of an annular core, and a rotor provided on an inner side in the radial direction of the stator with a predetermined interval therebetween, the inspection device including: an input unit to which a shape of an inspection target surface of the wedge exposed from the slot in a state in which no force is applied to the wedge is inputted; a relation storage unit which acquires and stores, as a deformation reaction force relation, a relation between a reaction force of the spring or the wedge at the inspection target surface of the wedge and deformation distribution from the shape of the inspection target surface of the wedge inputted to the input unit; a measurement unit for measuring measurement deformation distribution of the inspection target surface of the wedge; an estimation unit for estimating an estimation reaction force from the measurement deformation distribution and the deformation reaction force relation; and a judgement unit for judging whether proper or fault about looseness of the wedge on the basis of the estimation reaction force.

An inspection method for a rotating electrical machine according to the present disclosure is for inspecting a rotating electrical machine including a stator having a wedge for fixing, with a spring interposed or by having a spring function, a winding placed in a slot formed on an inner side in a radial direction of an annular core, and a rotor provided on an inner side in the radial direction of the stator with a predetermined interval therebetween, the inspection method including: an input step of inputting a shape of an inspection target surface of the wedge exposed from the slot in a state in which no force is applied to the wedge; a relation storing step of acquiring and storing, as a deformation reaction force relation, a relation between a reaction force of the spring or the wedge at the inspection target surface of the wedge and deformation distribution from the shape of the inspection target surface of the wedge inputted in the input step; a measurement step of measuring measurement deformation distribution of the inspection target surface of the wedge; and an estimation step of estimating an estimation reaction force from the measurement deformation distribution and the deformation reaction force relation.

Effect of the Invention

The inspection device and the inspection method for the rotating electrical machine according to the present disclosure do not need change in structure and can conduct inspection without increase in the number of processing steps.

BRIEF DESCRIPTION OF THE DRAWINGS

FIG. 6A is a plan view showing a structure of a wedge in the slot shown in FIG. 5.

FIG. 6B is a sectional view showing the structure of the wedge in the slot shown in FIG. 5.

FIG. 11A shows a structure of the wedge, a spring, and the stator core at the slot shown in FIG. 4.

FIG. 11B is a diagram obtained by modeling the structure shown in FIG. 11A.

FIG. 11C is a graph showing a relation between a measurement position and a deformation amount of an inspection target surface of the wedge shown in FIG. 11A.

FIG. 11D shows an expression representing a deformation reaction force relation in embodiment 1.

FIG. 12A shows a structure of the wedge, the spring, and the stator core at the slot shown in FIG. 4.

FIG. 12B is a diagram obtained by modeling the structure shown in FIG. 12A.

FIG. 12C is a graph showing a relation between a measurement position and a deformation amount of an inspection target surface of the wedge shown in FIG. 12A.

FIG. 15A shows a structure of the wedge, the spring, and the stator core at the slot shown in FIG. 4.

FIG. 15B is a diagram obtained by modeling the structure shown in FIG. 15A.

FIG. 15C is a graph showing a relation between a measurement position and a deformation amount of an inspection target surface of the wedge shown in FIG. 15A.

FIG. 15D shows an expression representing a deformation reaction force relation in embodiment 2.

FIG. 16 is a flowchart showing an inspection method by an inspection device for a rotating electrical machine in embodiment 3.

FIG. 17A shows a structure of the wedge, the spring, and the stator core at the slot shown in FIG. 4.

FIG. 17B is a diagram obtained by modeling the structure shown in FIG. 17A.

FIG. 17C is a graph showing a relation between a measurement position and a deformation amount of an inspection target surface of the wedge shown in FIG. 17A.

FIG. 17D shows an expression representing a deformation reaction force relation in embodiment 3.

FIG. 19A shows a structure of the wedge, the spring, and the stator core at the slot shown in FIG. 4.

FIG. 19B is a diagram obtained by modeling the structure shown in FIG. 19A.

FIG. 19C is a graph showing a relation between a measurement position and a deformation amount of an inspection target surface of the wedge shown in FIG. 19A.

FIG. 19D shows an expression representing a deformation reaction force relation in embodiment 4.

DESCRIPTION OF EMBODIMENTS

Figure 1:
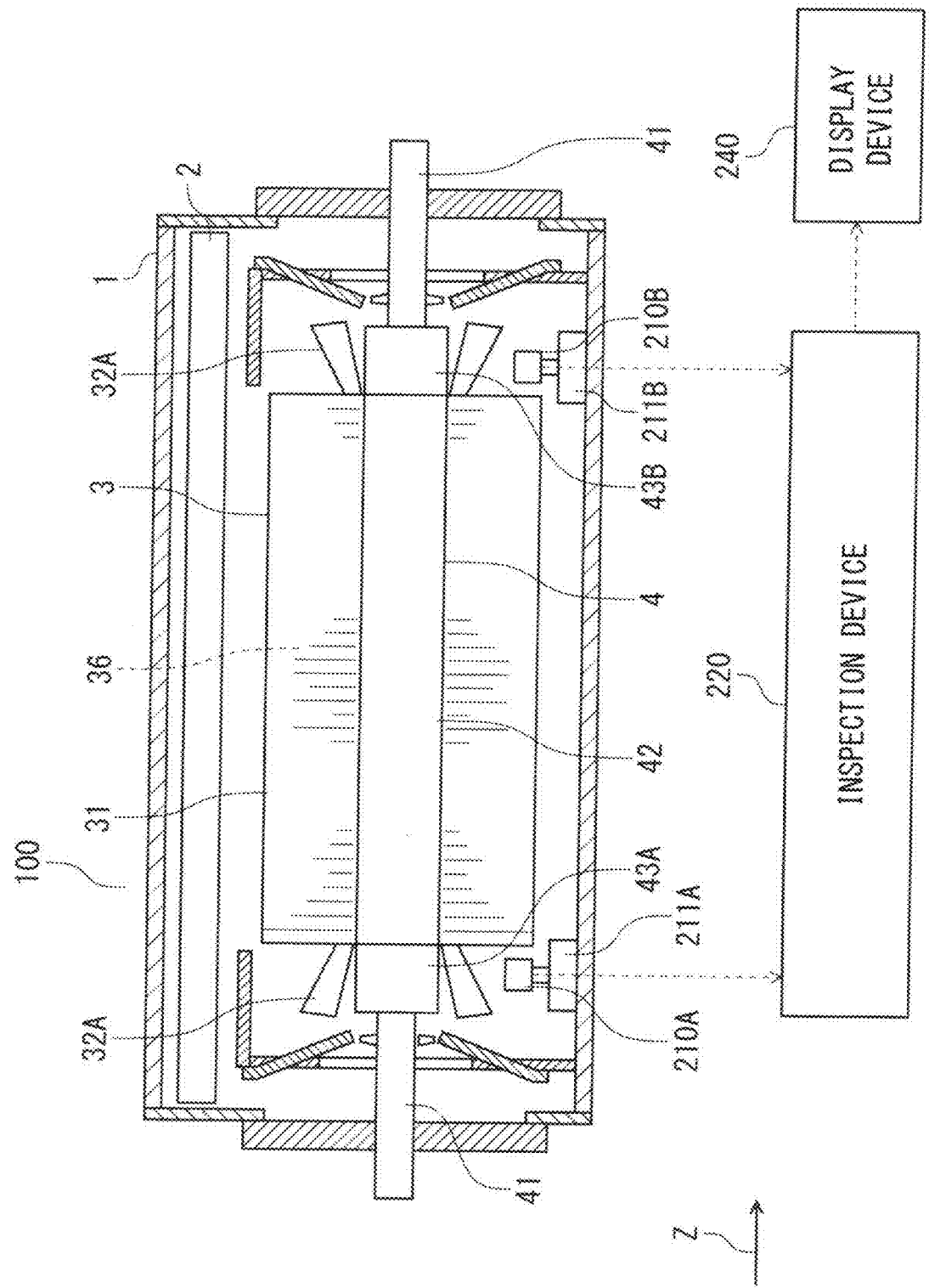
FIG. 1 is a schematic diagram showing a configuration of a rotating electrical machine and an inspection device for the rotating electrical machine according to embodiment 1.

In the following description, directions about a rotating electrical machine 100 are represented as a circumferential direction X, an axial direction Z, a radial direction Y, an outer side YO in the radial direction Y, and an inner side YI in the radial direction Y. Therefore, for any part such as a stator 3 or a rotor 4 of the rotating electrical machine 100, directions are represented with reference to the above directions, to give description. The rotating electrical machine 100 which is an inspection target is assumed to be, as an example, a turbine electric generator that obtains a rotational force from a turbine as a prime mover. An inspection target surface 50 of the stator 3 is an inspection target surface 50 of a wedge 34. In the description, strain is mainly used as an example of deformation of the inspection target surface 50. In the description, digital image correlation is used as an example of a strain measurement method. Cases of other examples will be described as necessary.

Embodiment 1

Figure 2:
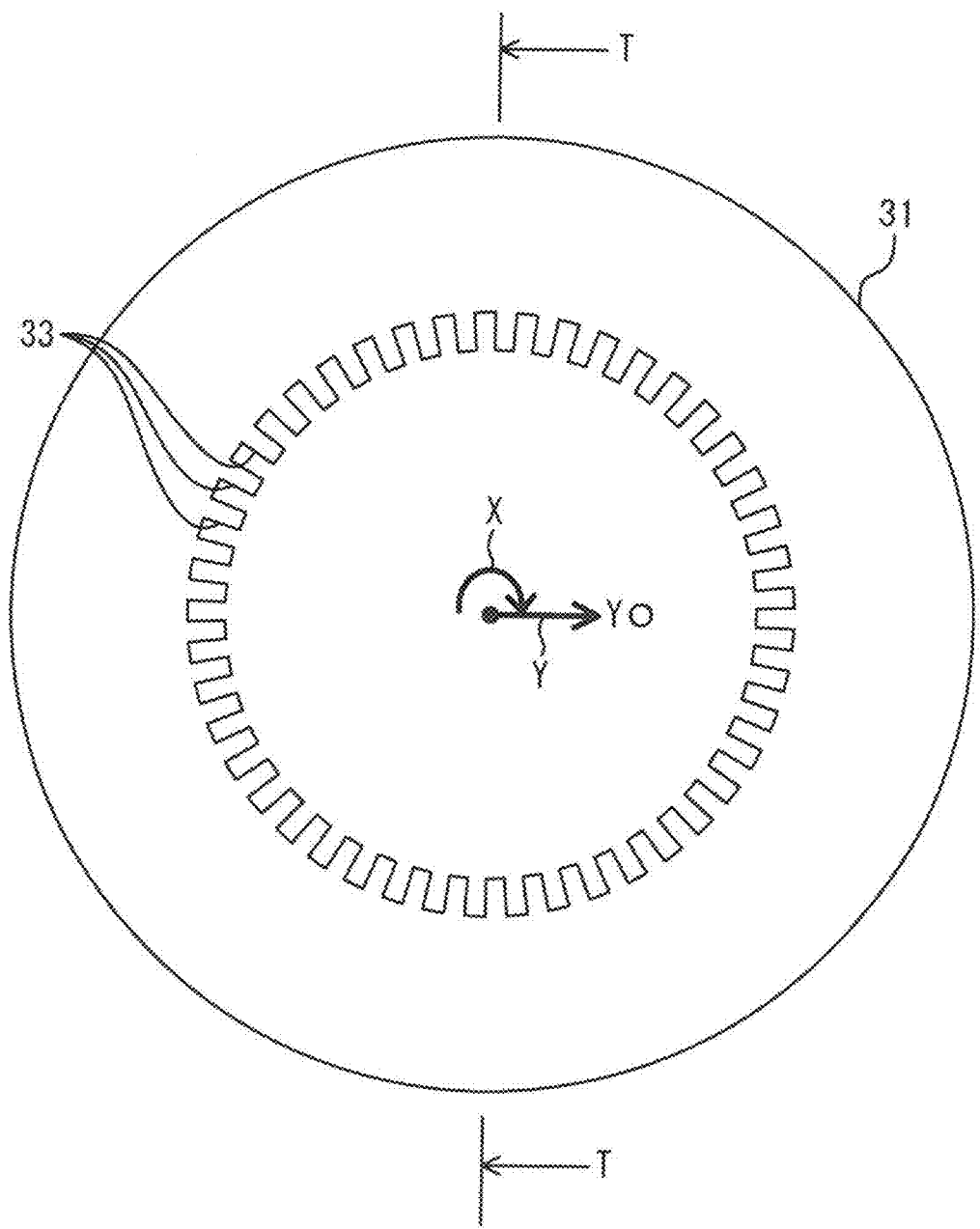
FIG. 2 is a schematic view showing a cross-section structure of a stator core shown in FIG. 1, along a direction perpendicular to the axial direction.
Figure 3:
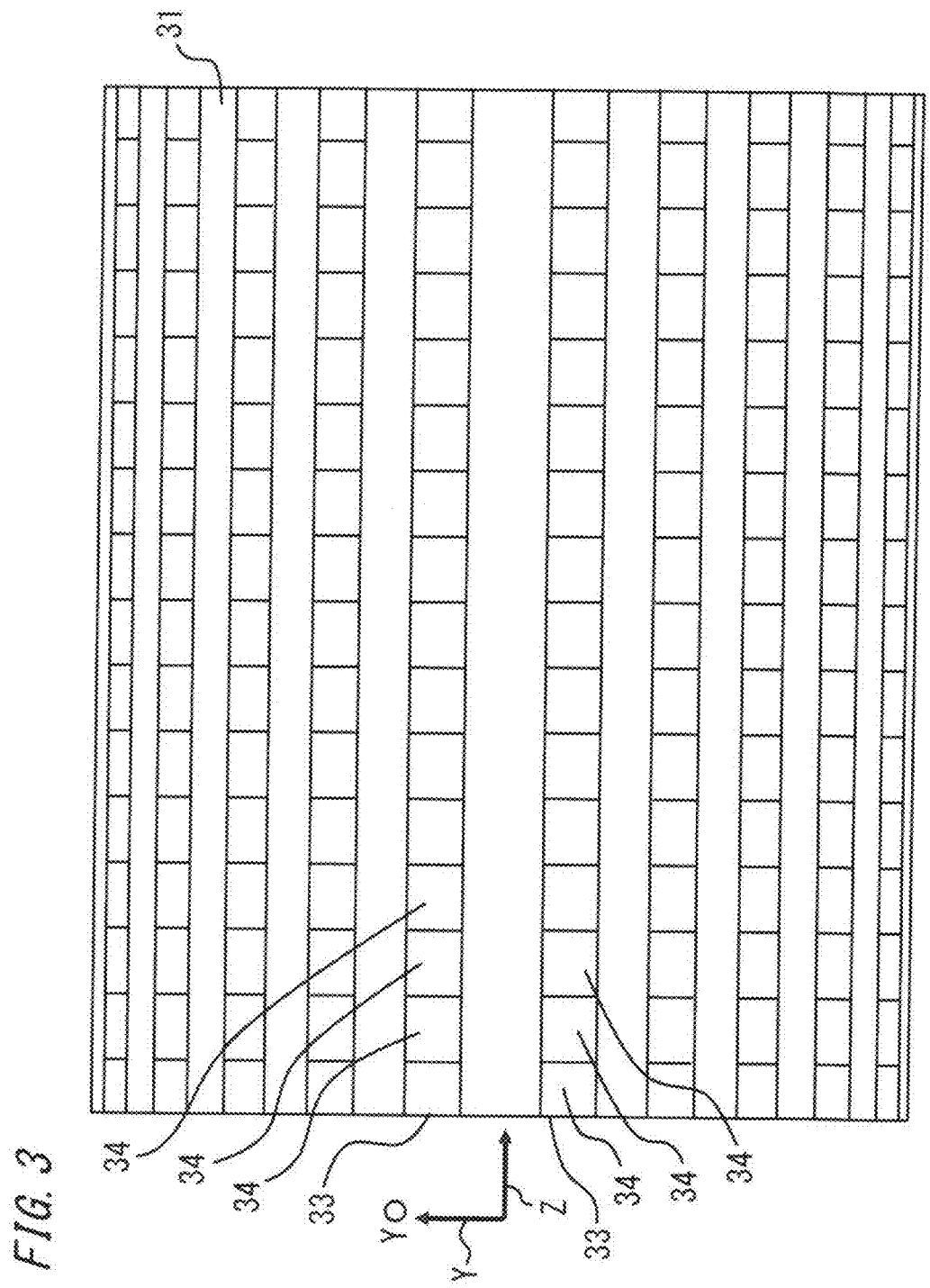
FIG. 3 is a schematic view showing a cross-section structure of the stator core shown in FIG. 2, along line T-T perpendicular to the circumferential direction.

FIG. 1 is a schematic diagram showing a configuration of a rotating electrical machine inspection device according to embodiment 1 and a rotating electrical machine which is an inspection target. FIG. 2 is a schematic view showing a cross-section of a stator core (hereinafter, referred to as core) of the rotating electrical machine shown in FIG. 1, along a direction perpendicular to the axial direction Z. FIG. 2 shows slots in the core, and here, directions of a structure in the slot are represented in a cylindrical coordinate system. FIG. 3 is a schematic view showing a cross-section of the core of the rotating electrical machine shown in FIG. 1, along a direction (line T-T in FIG. 2) perpendicular to the circumferential direction X.

Figure 4:
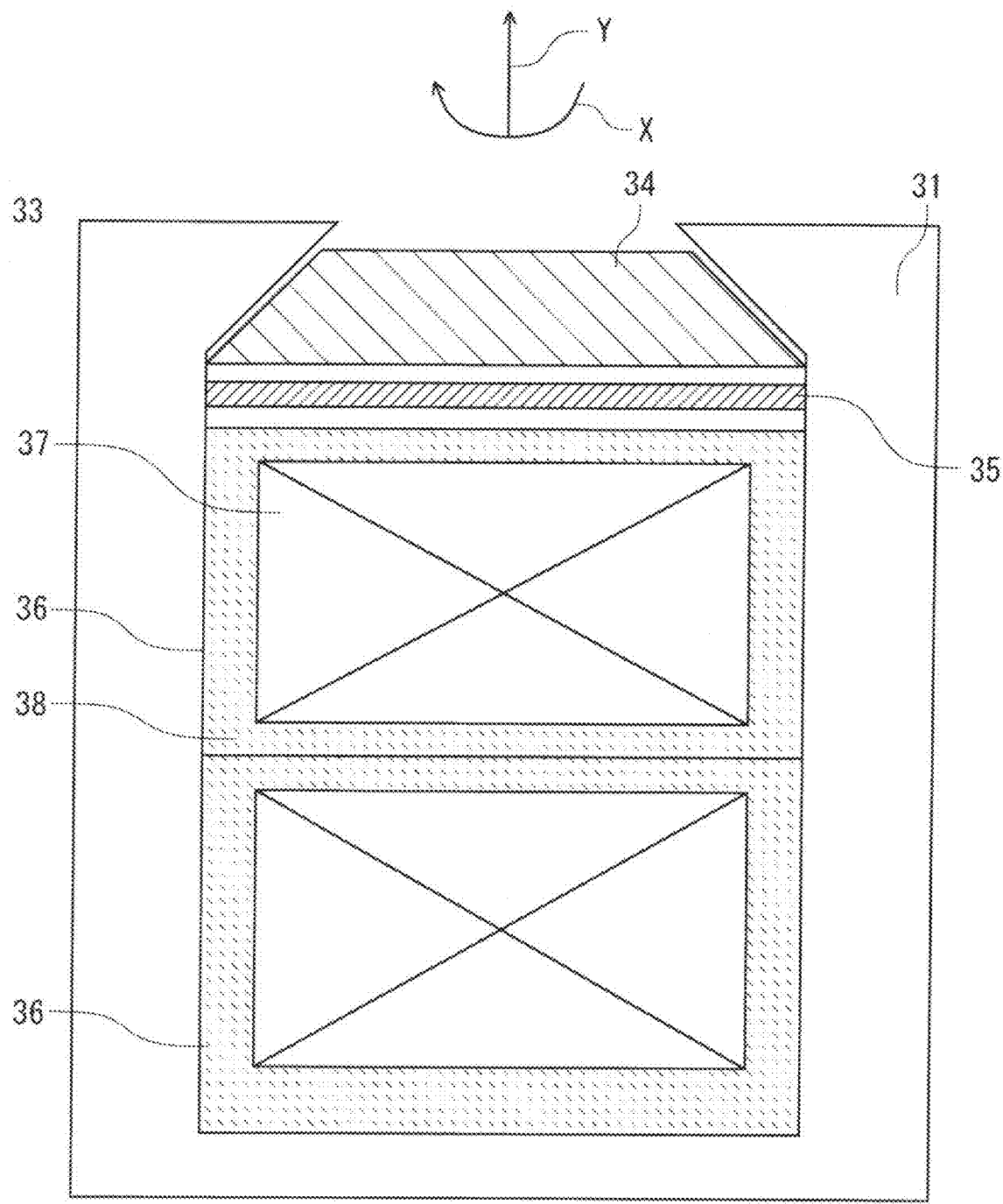
FIG. 4 is a schematic view showing a cross-section structure of a slot shown in FIG. 2, along a direction perpendicular to the axial direction.
Figure 5:
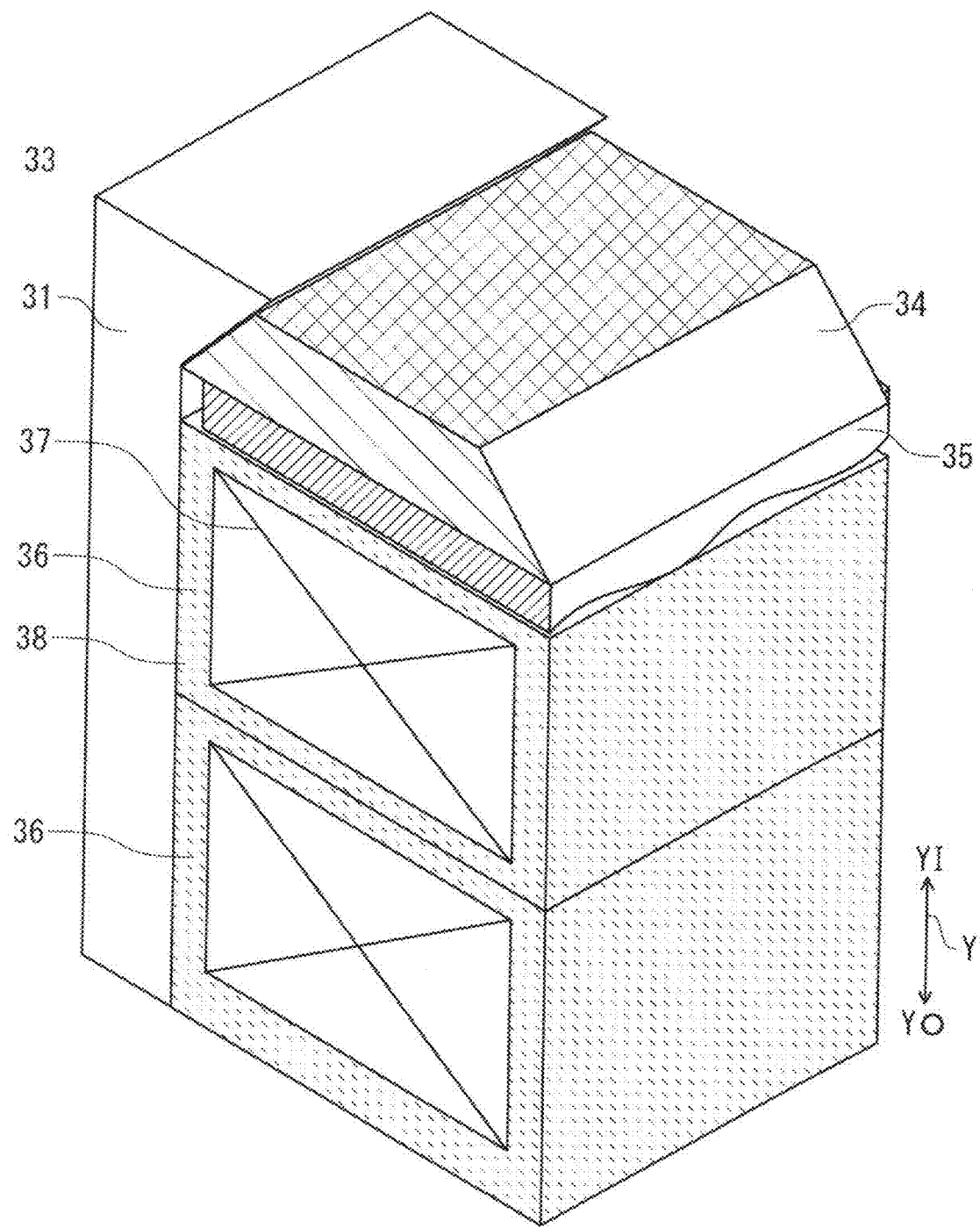
FIG. 5 is a perspective view showing a structure inside the slot shown in FIG. 4.
Figure 7:
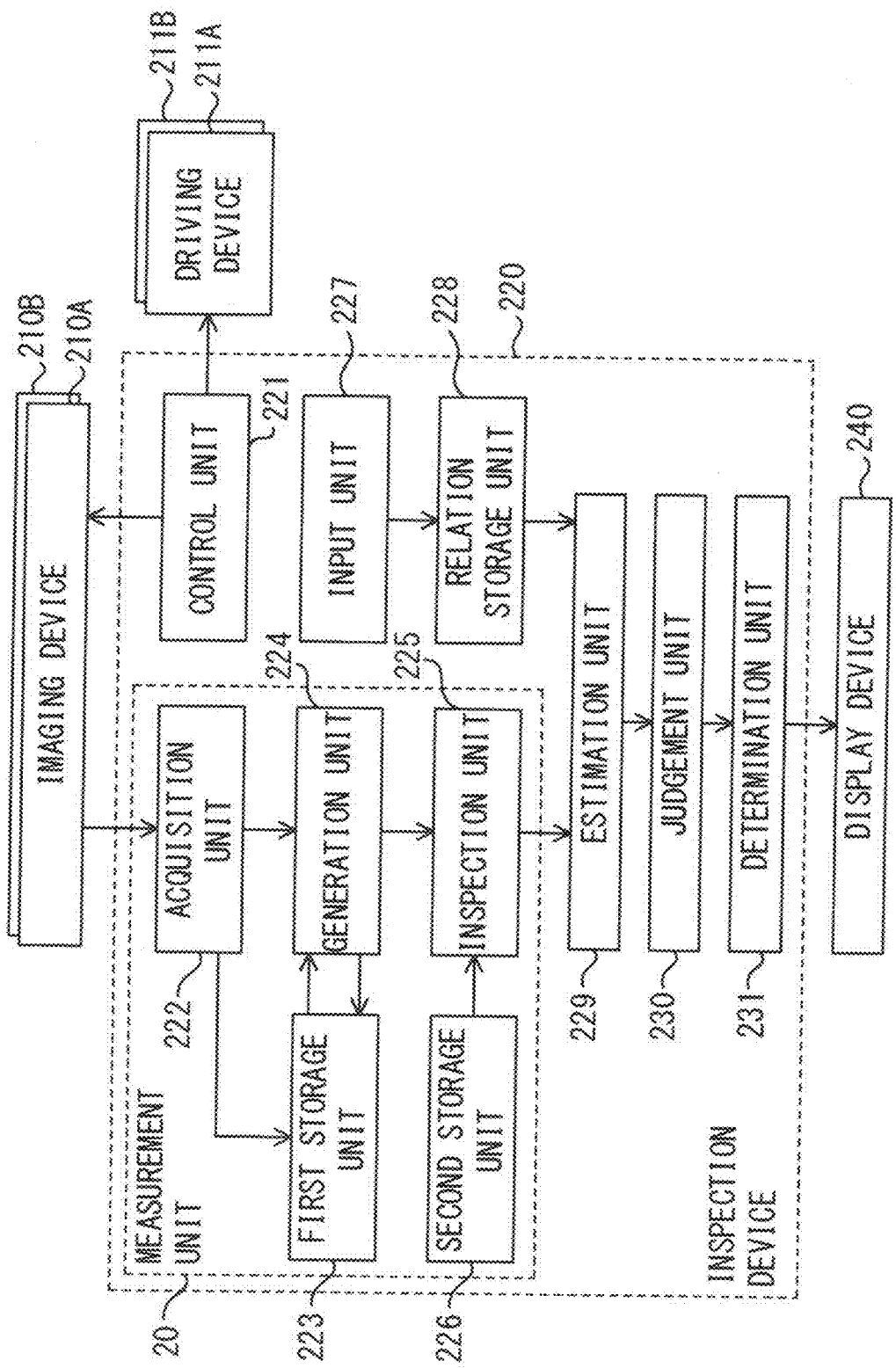
FIG. 7 is a block diagram showing a configuration of the inspection device for the rotating electrical machine shown in FIG. 1.
Figure 8:
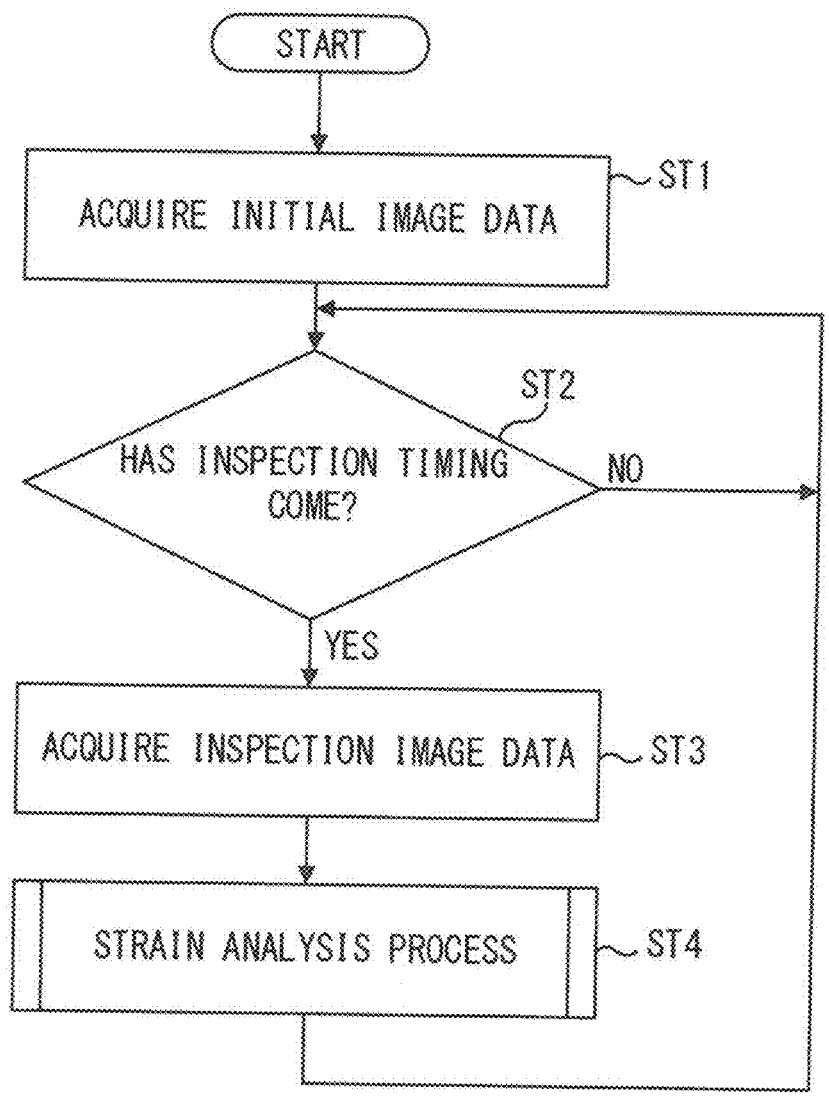
FIG. 8 is a flowchart showing an inspection method by the inspection device for the rotating electrical machine shown in FIG. 7.
Figure 9:
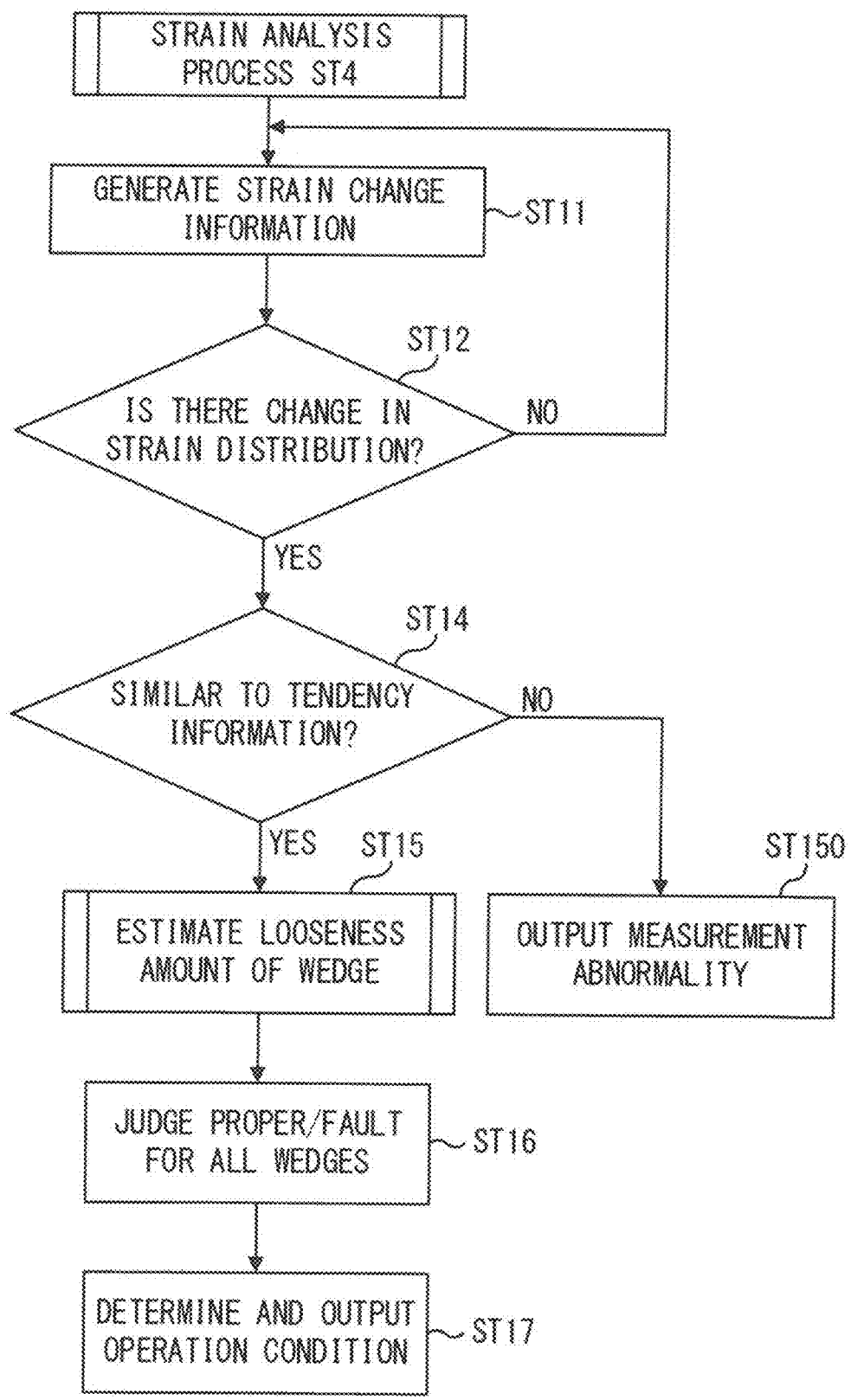
FIG. 9 is a flowchart showing the inspection method by the inspection device for the rotating electrical machine shown in FIG. 7.
Figure 10:
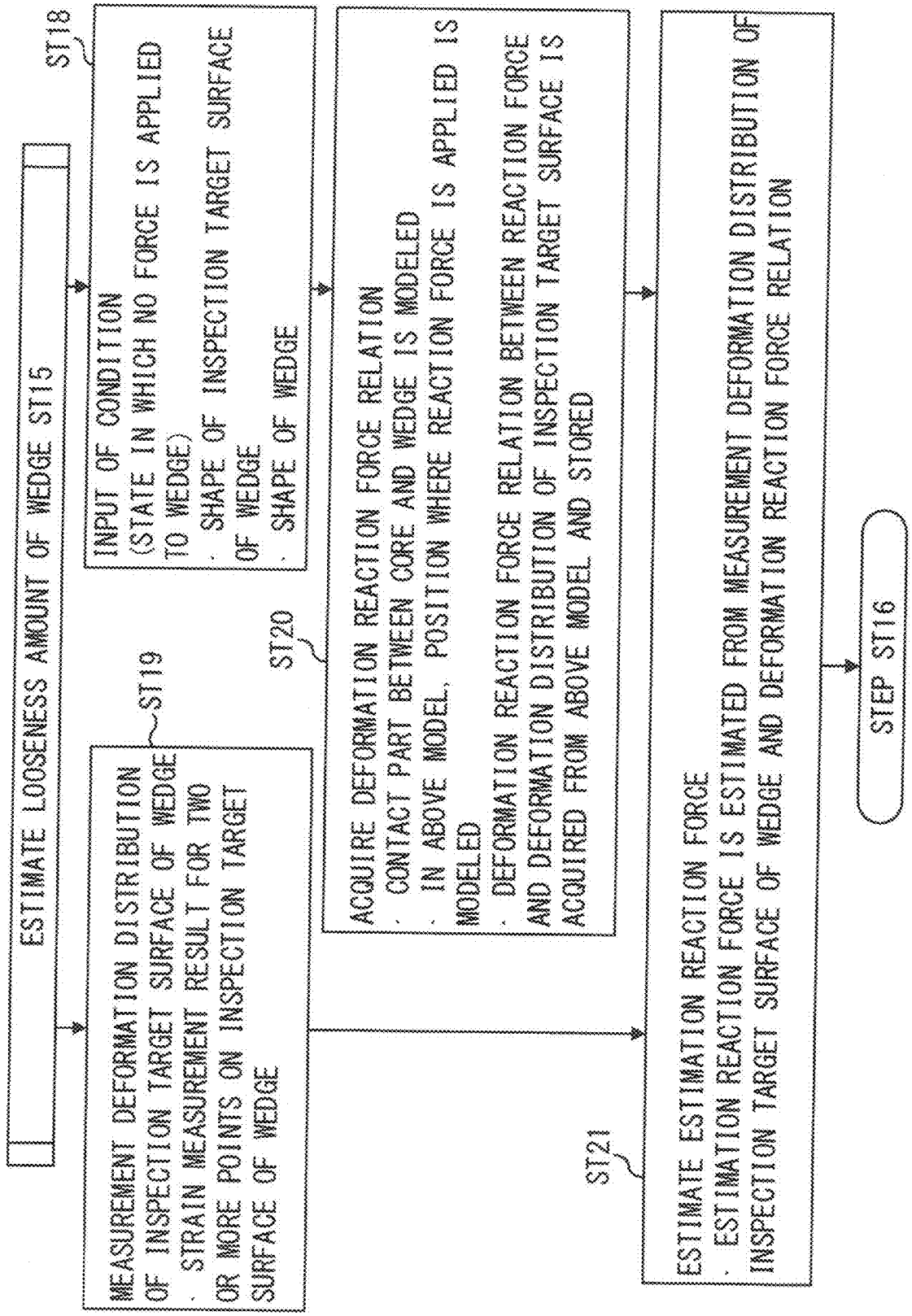
FIG. 10 is a flowchart showing the inspection method by the inspection device for the rotating electrical machine shown in FIG. 7.

FIG. 4 is a schematic view showing a cross-section structure of the slot shown in FIG. 2, along a direction perpendicular to the axial direction. FIG. 5 is a perspective view showing a structure inside the slot shown in FIG. 4. FIG. 6 shows a structure of a wedge in the slot, in which FIG. 6A is a plan view showing the structure of the wedge and FIG. 6B is a sectional view showing the structure of the wedge. FIG. 7 is a block diagram showing a configuration of the inspection device for the rotating electrical machine shown in FIG. 1. FIG. 8 to FIG. 10 are flowcharts showing the inspection method by the inspection device for the rotating electrical machine shown in FIG. 7.

In FIG. 1, the rotating electrical machine 100 includes a frame 1, and a gas cooler 2, the stator 3, and the rotor 4 which are contained in the frame 1. In the frame 1, a coolant, e.g., cooling gas, for removing heat generated through electric generation circulates, and the gas cooler 2 cools the coolant. The stator 3 includes a stator core 31 (hereinafter, referred to as core 31) and a winding 36. The core 31 has a cylindrical shape and is mounted in a fixed state in the frame 1.

As shown in FIG. 2, a plurality of slots 33 are formed on the outer side YO in the radial direction Y of the core 31. The winding 36 is contained in each slot 33 of the core 31. As shown in FIG. 4 and FIG. 5, the wedge 34 is provided above the winding 36 in each slot 33, with a spring 35 interposed therebetween. As shown in FIG. 3, a plurality of wedges 34 are provided along the axial direction Z in each slot 33. The wedges 34 are mounted so that the winding 36 which is a structural component in the slot 33 of the core 31 will not come off.

As shown in FIG. 1, parts of the windings 36 are led out from both ends in the axial direction Z of the core 31, to form coil end portions 32A. A main lead (not shown) extending to the outside of the frame 1 is connected to the coil end portion 32A at one of both ends in the axial direction Z. Electric power generated by the rotating electrical machine 100 is extracted to the outside via the main lead.

The rotor 4 includes a pair of rotary shafts 41, a rotor core 42, and retention rings 43A, 43B. The rotor 4 is provided on the outer side YO in the radial direction Y of the stator 3 with a predetermined interval therebetween. The pair of rotary shafts 41 are provided on both sides across the rotor core 42. The axes of the pair of rotary shafts 41 and the axis of the rotor core 42 coincide with each other. The axial direction Z parallel to the axis of the pair of rotary shafts 41 and the rotor core 42 is identical to the axial direction Z of the rotating electrical machine 100. In addition, the radial direction Y about the axis of the pair of the rotary shafts 41 and the rotor core 42 is identical to the radial direction Y of the rotating electrical machine 100. In addition, the circumferential direction X about the axis of the pair of the rotary shafts 41 and the rotor core 42 is identical to the circumferential direction X of the rotating electrical machine 100.

The pair of rotary shafts 41 are rotatably supported by bearings provided to the frame 1. The rotor 4 is rotated relative to the stator 3 by a prime mover (not shown) which is a turbine in this example. The core 31 and the winding 36 are located on the outer side YO in the radial direction Y of the rotor core 42, and are subjected to a magnetic flux generated from the rotor core 42, whereby current is generated in the winding 36. The retention rings 43A, 43B are respectively attached at one end and the other end in the axial direction Z of the rotor core 42, and are exposed to the outside of the core 31.

As shown in FIG. 1 and FIG. 7, an inspection device 220 of the rotating electrical machine 100 (hereinafter, referred to as inspection device 220) is connected to imaging devices 210A, 210B, driving devices 211A, 211B, and a display device 240. The imaging devices 210A, 210B are provided in the frame 1 of the rotating electrical machine 100. Each imaging device 210A, 210B images the wedge 34 having the inspection target surface 50, generates image data of the inspection target surface 50, and transmits the generated image data to the inspection device 220.

The driving devices 211A, 211B move, along the axial direction Z, the imaging devices 210A, 210B through a space in the radial direction Y between the rotor core 42 and the core 31 in the frame 1. Thus, without disassembling the rotor 4 of the rotating electrical machine 100, the wedges 34 having the inspection target surfaces 50 can be imaged, whereby an inspection period can be shortened. The imaging device 210A is provided on the outer side YO in the radial direction Y of the core 31, and images the core 31 while being moved in the axial direction Z by the driving device 211A. The imaging device 210B is provided on the outer side YO in the radial direction Y of the core 31, and images the core 31 while being moved in the axial direction Z by the driving device 211B.

Each imaging device 210A, 210B images the core 31 in a specific initial period, and transmits generated image data as initial image data to the inspection device 220. For example, the initial period refers to a period before the wedges 34 are mounted to the core 31, i.e., in a state in which no force is applied to the wedges 34.

Then, after operation of the rotating electrical machine 100 is started, each imaging device 210A, 210B images the core 31 in a predetermined inspection period, and transmits generated image data as inspection image data to the inspection device 220. For example, the inspection period may be any of a period set so as to come with a certain cycle after operation of the rotating electrical machine 100 is started, a period set so that intervals of inspection periods are gradually shortened with increase in the elapsed time since the start of operation of the rotating electrical machine 100, a period set on the basis of the actual operation time of the rotating electrical machine 100 instead of a mere elapsed time, or a period set on the basis of the temperature or humidity in the frame 1 because the deterioration speed of the core 31 differs depending on the temperature or humidity in the frame 1.

The inspection device 220 generates change of strain distribution in the inspection target surface 50 as strain deformation distribution, by digital image correlation, on the basis of the inspection image data generated by the imaging devices 210A, 210B. The digital image correlation is a method in which the inspection target surface 50 is imaged before and after deformation of the inspection target surface 50, and then, from luminance distribution in obtained digital image data, a displacement amount and a displacement direction of the inspection target surface 50 are calculated at the same time. The strain deformation distribution includes a displacement amount and a displacement direction in the inspection target surface 50. The display device 240 displays various kinds of information generated by the inspection device 220.

FIG. 4 is a schematic view showing a cross-section of the slot 33 along a direction perpendicular to the axial direction Z. The winding 36 through which output current flows is placed in each slot 33. The winding 36 vibrates due to an electromagnetic excitation force caused by the current flowing through the winding 36. Therefore, in order to retain the winding 36 so as not to move by the vibration, the spring 35 and the wedge 34 for preventing coming-off are provided in the slot 33. The winding 36 is composed of a conductor 37 and an insulation portion 38. The insulation portion 38 is made of a resin material. FIG. 5 is a perspective view of the slot 33. The spring 35 has a shape waving along the axial direction Z, and when the wedge 34 is mounted, the spring 35 is compressed and mounted together, so that the winding 36 is retained by a reaction force from the core 31.

FIG. 6 is a schematic view of the wedge 34. The inspection target surface 50 is formed by applying a random pattern on a part of the wedge 34 on the rotor 42 side of the rotating electrical machine 100, excluding parts that are in contact with the core 31 and thus cannot be seen from the rotor 42 side of the rotating electrical machine 100. The random pattern is formed over the entire area in the circumferential direction X and the axial direction Z of the inspection target surface 50. The random pattern may be formed by pasting a sheet provided with a pattern, instead of the applying method. The random pattern may be formed on all of the wedges 34 in the core 31 shown in FIG. 3. Since the random pattern is formed on the inspection target surface 50, change of strain in the wedge 34 appears large and thus can be easily imaged by the imaging devices 210A, 210B. In addition, if the pattern is formed randomly as in this random pattern, accuracy of measurement for strain is improved and the direction of strain to be measured can be freely determined.

FIG. 7 is a block diagram showing a functional configuration of the inspection device 220. As shown in FIG. 7, the inspection device 220 includes a control unit 221, an acquisition unit 222, a first storage unit 223, a generation unit 224, an inspection unit 225, a second storage unit 226, an input unit 227, a relation storage unit 228, an estimation unit 229, a judgement unit 230, a determination unit 231, and a measurement unit 20.

The control unit 221 controls the imaging devices 210A, 210B and the driving devices 211A, 211B so as to image the inspection target surface 50 in the initial period and the predetermined inspection period. The acquisition unit 222 acquires initial image data and subsequent inspection image data transmitted from the imaging devices 210A, 220B, and outputs each image data to the first storage unit 223 and the generation unit 224.

The first storage unit 223 stores the initial image data and the inspection image data given from the acquisition unit 222. On the basis of the inspection image data given from the acquisition unit 222 and the initial image data and the inspection image data stored in the first storage unit 223, the generation unit 224 generates strain deformation distribution in the wedge 34 by digital image correlation, and outputs the strain deformation distribution to the inspection unit 225.

Specifically, the generation unit 224 compares the initial image data stored in the first storage unit 223 and the inspection image data given from the acquisition unit 222, and on the basis of difference therebetween, generates strain deformation distribution which represents change in strain distribution of the inspection target surface 50 during a period until the present time since before occurrence of strain change.

In addition, every time the inspection period comes, the generation unit 224 may compare the inspection image data for the previous inspection period stored in the first storage unit 223 and the inspection image data for the present inspection period given from the acquisition unit 222, and on the basis of difference therebetween, may generate strain deformation distribution which represents change in strain distribution of the inspection target surface 50 during a period (hereinafter, referred to as operation period) from the previous inspection period to the present inspection period. In this case, it is possible to obtain the degree of change of strain distribution (hereinafter, referred to as strain change degree) during each operation period on the basis of the strain deformation distribution in each inspection period.

On the basis of the strain change degree, abnormality judgement for the wedge 34 may be performed. For example, if a difference between the strain change degree for the previous operation period and the strain change degree for the present operation period exceeds a prescribed value, the wedge 34 may be judged to be abnormal, and a worker may be notified accordingly. In addition, the inspection device 220 may cause the strain deformation distribution generated in each inspection period to be stored and may perform abnormality judgement through comparison among a plurality of strain deformation distributions for a plurality of inspection periods.

The second storage unit 226 stores shape information of the rotating electrical machine 100 which is an inspection target, and tendency information representing tendency of strain deformation distribution of the inspection target surface 50 in a case where looseness occurs in the wedge 34 from a reference at the time of mounting the wedge 34. The tendency information indicates a correspondence relation between the amount of looseness occurring in the wedge 34 and strain deformation distribution in the wedge 34, and is generated on the basis of actual measurement, simulation, or the like. The inspection unit 225 outputs, to the estimation unit 229, a result of measurement for the inspection target surface 50 of the wedge 34 which has been judged not to be measurement abnormality on the basis of the strain deformation distribution given from the generation unit 224 and the tendency information stored in the second storage unit 226. Thus, the measurement unit 20 includes the acquisition unit 222, the generation unit 224, the inspection unit 225, the first storage unit 223, and the second storage unit 226.

A condition in a state in which no force is applied to the wedge 34 is inputted to the input unit 227, and then is outputted to the relation storage unit 228. On the basis of the condition inputted to the input unit 227, the relation storage unit 228 acquires and stores a deformation reaction force relation between a reaction force and deformation distribution of the inspection target surface 50 of the wedge 34. The estimation unit 229 estimates an estimation reaction force from a measurement result for the inspection target surface 50 of the wedge 34 measured by the measurement unit 20 and the deformation reaction force relation stored in the relation storage unit 228.

The judgement unit 230 compares the estimation reaction force estimated by the estimation unit 229 with a reference value, to judge the wedge 34, and outputs the judgement result to the determination unit 231. The determination unit 231 determines whether or not there is update of the wedge 34 from the judgement result of the judgement unit 230, determines an appropriate operation condition for the rotating electrical machine 100, and outputs the determined operation condition to the display device 240. The operation condition includes a time during which the rotating electrical machine 100 can continue operation (hereinafter, referred to as operable time), and output of the rotating electrical machine 100 (hereinafter, referred to as appropriate output). In this case, the determination unit 231 can calculate the operable time and the appropriate output from the looseness amount and the looseness occurrence position of the wedge 34.

An electromagnetic excitation force applied to the wedge 34 depends on the output of the rotating electrical machine 100. Therefore, by limiting the output of the rotating electrical machine 100, the electromagnetic excitation force applied to the wedge 34 can be reduced. The operable time is a time serving as a criterion for a timing when repair or part replacement should be performed, and is a time during which the rotating electrical machine 100 can be stably operated from the start of the operation in the case where the rotating electrical machine 100 is operated at the appropriate output.

The display device 240 displays the operation condition given from the determination unit 231. The worker can adjust the rotating electrical machine 100 to the appropriate output on the basis of the display on the display device 240, whereby the life of the rotating electrical machine 100 can be prolonged even though the output is limited. In addition, the worker can perform repair or part replacement at an appropriate timing on the basis of the displayed operable time.

The determination unit 231 may output the determined appropriate output to a control device (not shown) for controlling the output of the rotating electrical machine 100. In this case, the output of the rotating electrical machine 100 can be automatically adjusted to the appropriate output by the control device. The determination unit 231 may output the determined operable time to an alarm device (not shown). In this case, when the operation time of the rotating electrical machine 100 becomes close to or reaches the operable time, the alarm device issues an alarm (e.g., alarm buzzer). Thus, the worker can easily recognize the timing when repair or part replacement should be performed.

At least one of the strain deformation distribution in the measurement result of the measurement unit 20, the estimation reaction force as the looseness amount in the wedge 34 estimated by the estimation unit 229, or the like may be displayed on the display device 240. In this case, the worker can acquire various kinds of information by viewing the display on the display device 240.

Next, a method for inspecting the rotating electrical machine 100 by the inspection device 220 according to embodiment 1 configured as described above will be described with reference to FIG. 8 to FIG. 11. FIG. 11A shows the actual structure of the wedge 34, the spring 35, and the core 31. FIG. 11B is a diagram obtained by modeling the structure shown in FIG. 11A. FIG. 11C is a graph showing a relation between a measurement position and a deformation amount of the inspection target surface 50 of the wedge 34 shown in FIG. 11A. FIG. 11D shows an expression representing the deformation reaction force relation in embodiment 1.

First, when the rotating electrical machine 100 is assembled or when the wedge 34 has no looseness or the loosened wedge 34 is replaced in a case such as regular inspection where the rotating electrical machine 100 is disassembled, for example, a random pattern (or graphic pattern) is applied to a predetermined surface of the wedge 34 exposed from the slot 33, to form the inspection target surface 50. The random pattern on the inspection target surface 50 may be formed in advance before mounting of the wedge 34. Then, the control unit 221 controls the driving devices 211A, 211B and the imaging devices 210A, 210B to take initial image data of the inspection target surface 50 in a state in which no force is applied to the wedge 34, and the acquisition unit 222 acquires the initial image data and stores the same into the first storage unit 223 (step ST1 in FIG. 8). The method for acquiring image data of the inspection target surface 50 of the wedge 34 is the same also in the following description, and therefore the description thereof is omitted as appropriate.

Next, whether or not a predetermined inspection timing has come due to any of various factors such as the operation time, is judged (step ST2 in FIG. 8). If the inspection timing has not come (NO), step ST2 is repeated. If the inspection timing has come (YES), the acquisition unit 222 acquires the inspection image data of the inspection target surface 50 of the wedge 34, and stores the inspection image data into the first storage unit 223 (step ST3 in FIG. 8). Then, a strain analysis process (step ST4 in FIG. 8) for the wedge 34 is performed. This operation is repeatedly performed during the inspection period.

Next, the processing content of the "strain analysis process (step ST4)" shown in FIG. 8 will be described with reference to FIG. 9. The generation unit 224 generates information of strain deformation distribution from the inspection image data acquired by the acquisition unit 222 and the previous inspection image data stored in the first storage unit 223 (step ST11 in FIG. 9). Next, whether or not there is change in the strain deformation distribution is judged (step ST12 in FIG. 9). Then, if there is no change (NO), operation in step ST11 is repeated. If there is change (YES), the inspection unit 225 judges whether or not the strain deformation distribution is similar to assumed strain deformation distribution, i.e., the tendency information stored in the second storage unit 226 (step ST14 in FIG. 9).

If they are not similar (NO), a fact that the measurement is abnormal is outputted (step ST150 in FIG. 9). If they are similar (YES), the estimation unit 229 estimates an estimation reaction force as a looseness amount of the wedge 34 on the basis of the measurement result from the measurement unit 20 (step ST15 in FIG. 9). Next, the judgement unit 230 compares the estimation reaction force of the wedge 34 with a predetermined reference value. Then, if the estimation reaction force is equal to or greater than the reference value, the judgement unit 230 judges that the wedge 34 has no looseness, i.e., proper, and if the estimation reaction force is smaller than the reference value, the judgement unit 230 judges that the wedge 34 has looseness, i.e., fault (step ST16 in FIG. 9). Next, on the basis of the judgement result in step ST16, the operation condition for the rotating electrical machine 100 is determined and outputted to the display device 240 (step ST17 in FIG. 9).

Next, the content of processing of "estimating the looseness amount of the wedge 34 (step ST15)" shown in FIG. 9 will be described with reference to FIG. 10 and FIG. 11. First, the measurement unit 20 acquires a measurement result of measurement deformation distribution of the inspection target surface 50 of the wedge 34 (step ST19 in FIG. 10; measurement step). Specifically, as the measurement deformation distribution, distribution of strains at two or more points on the inspection target surface 50 of the wedge 34 is measured. For example, values of deformation amounts at Y1, Y2, Yn (n is an integer not less than 2) at measurement positions on the wedge 34 as shown in FIG. 11C are measured.

Next, information about the shape of the inspection target surface 50 and the shape of the wedge 34 when no force is applied to the wedge 34 is inputted from the input unit 227 (step ST18 in FIG. 10; input step). That is, actual shape information in FIG. 11A is inputted. Next, the relation storage unit 228 models contact parts 300 between the core 31 and the wedge 34, and on this model, the position where a reaction force F of the spring 35 is applied is modeled. For example, as shown in FIG. 11B, the wedge 34 is expressed as a two-dimensional model under the assumption that the reaction force F is constant in the axial direction Z of the actual wedge 34 (FIG. 11A). Then, using the contact parts 300 between the wedge 34 and the slot 33 as a constraint condition, a range where the reaction force F is applied to the wedge 34 is reflected as a load applied range, in the model.

The above model is solved through numerical analysis such as finite element method or material mechanics, to acquire the deformation reaction force relation between the deformation distribution (Y1, Y2, . . . , Yn) of the inspection target surface 50 and the reaction force F as shown in FIG.

11D, and the deformation reaction force relation is stored into the relation storage unit 228 (step ST20 in FIG. 10; relation storing step). Here, the example in which the deformation reaction force relation is acquired through numerical analysis has been shown, but without limitation thereto, the deformation reaction force relation may be obtained experimentally. The same applies to the other embodiments below and therefore the description thereof is omitted.

Next, from the deformation reaction force relation (FIG. 11D) stored in step ST20 and the measurement result in step ST19, the reaction force F of the spring 35 is estimated, and then is outputted as an estimation reaction force. Specifically, the estimation unit 229 sets the deformation reaction force relation stored in step ST20 on the basis of the measurement deformation distribution of the inspection target surface 50 of the wedge 34 in step ST19, here, the deformation amounts Y1, Y2, Yn at three measurement positions, and estimates the reaction force F as an estimation reaction force (step ST21 in FIG. 10; estimation step). As shown in the deformation reaction force relation between the deformation distribution (Y1, Y2, . . . , Yn) of the inspection target surface 50 and the reaction force F of the spring 35 in FIG. 11C, the reaction force F is estimated from the measurement positions, the strain deformation amounts, and the deformation reaction force relation.

In the above embodiment 1, measurement points which are measurement positions on the inspection target surface 50 of the wedge 34 are not particularly shown, but in this regard, another example will be described with reference to FIG. 12. FIG. 12A shows the actual structure of the wedge 34, the spring 35, and the core 31 at the slot 33 shown in FIG. 4. FIG. 12B is a diagram obtained by modeling the structure shown in FIG. 12A. FIG. 12C is a graph showing a relation between a measurement position and a deformation amount of the inspection target surface 50 of the wedge 34 shown in FIG. 12A.

For example, as shown in FIG. 12, the measurement points on the inspection target surface 50 of the wedge 34 may be set at a middle point XM (deformation value=YM) in the circumferential direction X which is a measurement point on the inspection target surface 50 of the wedge 34 where the strain change amount is maximum, and two points XE1 (deformation value=YE1) and XE2 (deformation value=YE2) near the contact parts 300 with the core 31 which are ends of the strain distribution that can be measured. Thus, the distribution can be grasped accurately. Further, if measurement points are added, the distribution can be grasped more accurately, whereby the estimation reaction force can be accurately estimated. The same applies to the other embodiments below and therefore the description thereof is omitted as necessary.

In the above embodiment 1, the example in which the deformation distribution in the wedge 34 is strain deformation distribution obtained by digital image correlation has been shown. However, without limitation thereto, for example, deformation distribution of either displacement or an angle of the inspection target surface 50 of the wedge 34 may be used. As a parameter for measuring the deformation distribution, a parameter for which measurement can be easily performed may be selected. Measurement means may be a strain gauge, an optical fiber, a strain sensor, a sampling moire camera, or the like. The same applies to the other embodiments below and therefore the description thereof is omitted as necessary.

Figure 13:
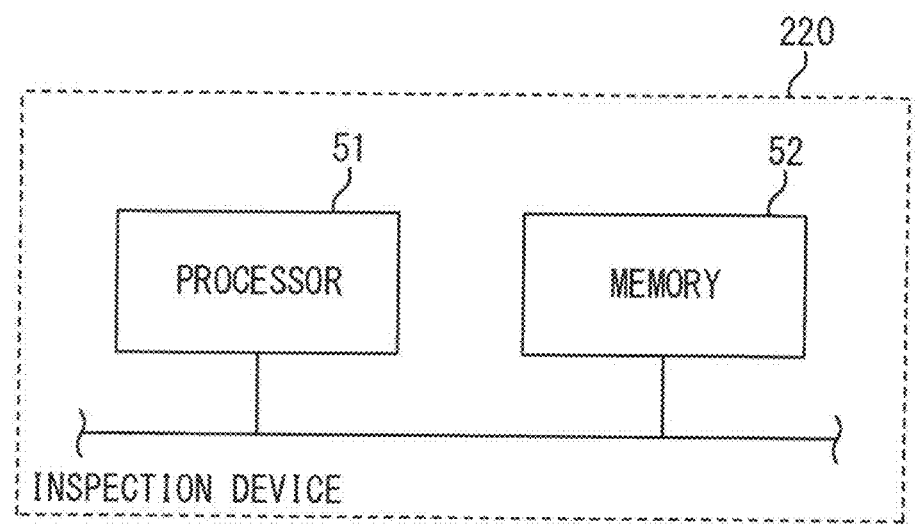
FIG. 13 is a block diagram showing a configuration of the inspection device for the rotating electrical machine in embodiment 1.

In the above embodiment 1, the inspection device 220 is shown with respective parts as shown in FIG. 7. However, as a matter of course, the inspection device 220 can be realized by having a processor 51 for implementing at least some of the functions by software and a memory 52 for storing information, as shown in FIG. 13, for example. The same applies to the other embodiments below and therefore the description thereof is omitted as necessary.

In the above embodiment 1, the example in which the stator has a wedge for fixing a winding with a spring interposed, has been shown. However, without limitation thereto, in the stator, the winding may be fixed by a wedge having a spring function. In this case, the same processing as for the spring described above can be performed on the basis of the reaction force of the wedge having a spring function. The same applies to the other embodiments below and therefore the description thereof is omitted as necessary.

The inspection device for the rotating electrical machine according to embodiment 1 configured as described above is for inspecting a rotating electrical machine including a stator having a wedge for fixing, with a spring interposed or by having a spring function, a winding placed in a slot formed on an inner side in a radial direction of an annular core, and a rotor provided on an inner side in the radial direction of the stator with a predetermined interval therebetween, the inspection device including:

an input unit to which a shape of an inspection target surface of the wedge exposed from the slot in a state in which no force is applied to the wedge is inputted;

a relation storage unit which acquires and stores, as a deformation reaction force relation, a relation between a reaction force of the spring or the wedge at the inspection target surface of the wedge and deformation distribution from the shape of the inspection target surface of the wedge inputted to the input unit;

a measurement unit for measuring measurement deformation distribution of the inspection target surface of the wedge;

an estimation unit for estimating an estimation reaction force from the measurement deformation distribution and the deformation reaction force relation; and a judgement unit for judging whether proper or fault about looseness of the wedge on the basis of the estimation reaction force.

Further, the inspection method for the rotating electrical machine is for inspecting a rotating electrical machine including a stator having a wedge for fixing, with a spring interposed or by having a spring function, a winding placed in a slot formed on an inner side in a radial direction of an annular core, and a rotor provided on an inner side in the radial direction of the stator with a predetermined interval therebetween, the inspection method including:

an input step of inputting a shape of an inspection target surface of the wedge exposed from the slot in a state in which no force is applied to the wedge;

a relation storing step of acquiring and storing, as a deformation reaction force relation, a relation between a reaction force of the spring or the wedge at the inspection target surface of the wedge and deformation distribution from the shape of the inspection target surface of the wedge inputted in the input step;

a measurement step of measuring measurement deformation distribution of the inspection target surface of the wedge;

an estimation step of estimating an estimation reaction force from the measurement deformation distribution and the deformation reaction force relation; and a judgement step of judging whether proper or fault about looseness of the wedge on the basis of the estimation reaction force.

As described above, looseness of the wedge is estimated from the measurement deformation distribution of the inspection target surface of the wedge. Thus, it becomes possible to inspect the wedge state in a short time and efficiently, without changing the wedge shape and a support structure for supporting the wedge and without disassembling the rotating electrical machine. Therefore, the strength of the wedge is prevented from being reduced due to the inspection.

The measurement unit sets a measurement point so as to include
- a middle point in a circumferential direction on the inspection target surface of the wedge, and
- in a case of measuring two or more points, a point closest to the core on the inspection target surface, thereby performing measurement.

Thus, since a plurality of points on the wedge are set as measurement points, it is possible to efficiently inspect change in the reaction force by one measurement without needing plural times of measurement.

Each of the deformation distribution and the measurement deformation distribution of the inspection target surface of the wedge is distribution of any of strain, displacement, or an angle of the inspection target surface.

Thus, change in looseness of the wedge can be assuredly judged.

Embodiment 2

In the present embodiment 2, the content of processing of "estimating the looseness amount of the wedge 34" in step ST15 shown in FIG. 9 is different as compared to the inspection device 220 and the inspection method for the rotating electrical machine 100 described in the above embodiment 1. Therefore, only the different content of processing of "estimating the looseness amount of the wedge 34" will be described with reference to FIG. 14 and FIG. 15.

Figure 14:
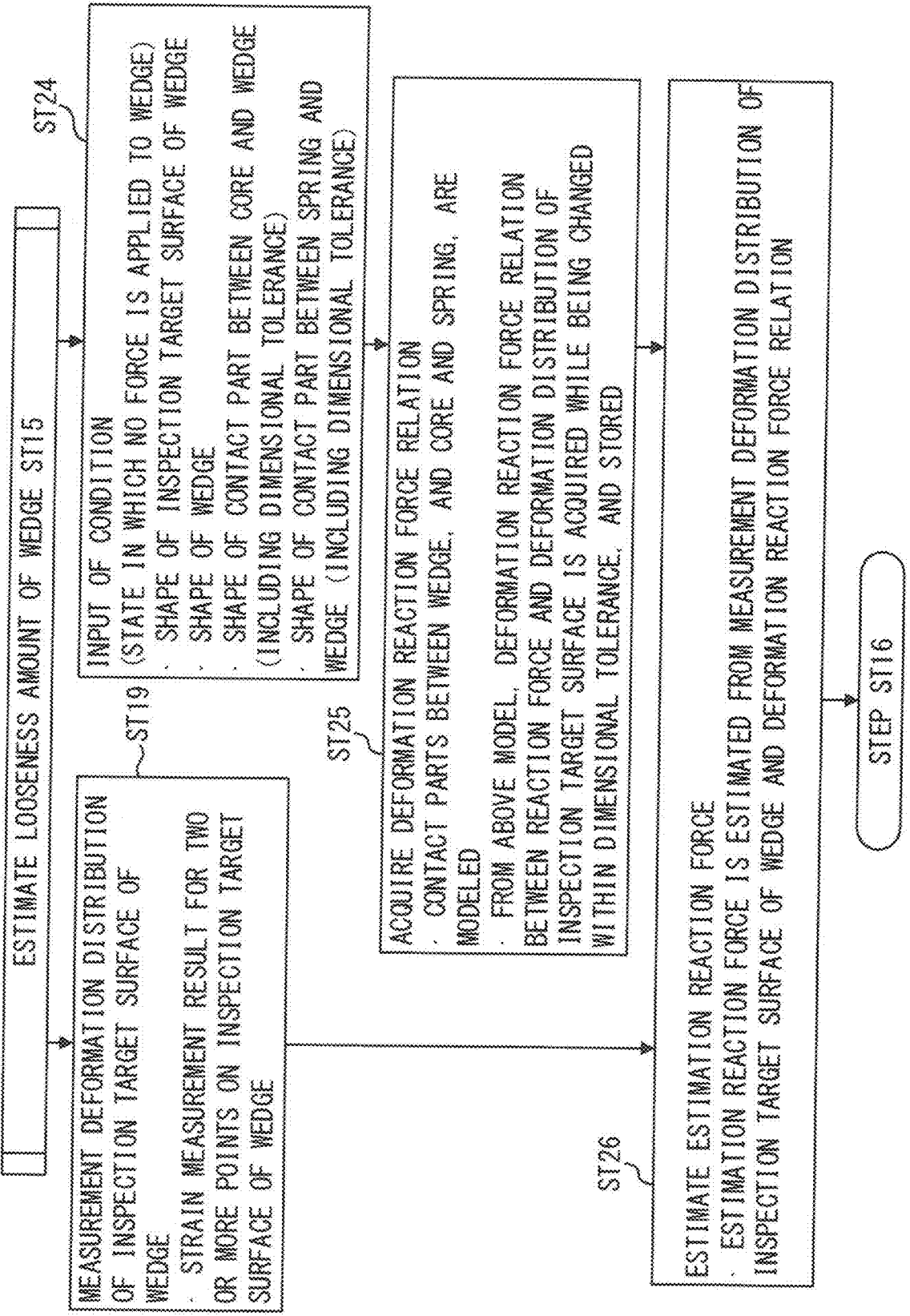
FIG. 14 is a flowchart showing an inspection method by an inspection device for a rotating electrical machine in embodiment 2.

FIG. 14 is a flowchart showing the content of "processing of estimating the looseness amount of the wedge 34" in step ST15 shown in FIG. 9 in the above embodiment 1, according to the present embodiment 2. The corresponding similar processing is shown in FIG. 10 in the above embodiment 1. FIG. 15A shows the actual structure of the wedge 34, the spring 35, and the core 31 at the slot 33 shown in FIG. 4. FIG. 15B is a diagram obtained by modeling the structure shown in FIG. 15A. FIG. 15C is a graph showing a relation between a measurement position and a deformation amount of the inspection target surface 50 of the wedge 34 shown in FIG. 15A. FIG. 15D shows an expression representing a deformation reaction force relation in embodiment 2.

Next, difference from the content of processing of "estimating the looseness amount of the wedge 34 (step ST15)" shown in the above embodiment 1 will be mainly described with reference to FIG. 14 and FIG. 15. First, in step ST24 in FIG. 14 corresponding to step ST18 in FIG. 10 in embodiment 1, in addition to the content in step ST18 in FIG. 10, the shape of the contact part 300 between the core 31 and the wedge 34 and the shape of a contact part between the wedge 34 and the spring 35 in the rotating electrical machine 100 are inputted. In this shape information, dimensional tolerance is included.

Next, in step ST25 in FIG. 14 corresponding to step ST20 in FIG. 10 in embodiment 1, in addition to the content in step ST20 in FIG. 10 in the above embodiment 1, while change is made within a range of dimensional tolerance for the contact part 300 between the core 31 and the wedge 34, calculation is performed through numerical analysis such as finite element method or material mechanics, to acquire a deformation reaction force relation which is a relation between a reaction force and deformation distribution of the inspection target surface 50. Specifically, as shown in FIG. 15, calculation is performed through numerical analysis such as finite element method or material mechanics for each contact part between the core 31 and the wedge 34, to acquire a relation between a reaction force and deformation distribution of the inspection target surface 50 shown in FIG. 15. The acquired result is stored in the relation storage unit 228.

Next, the deformation reaction force relation stored in step ST25, and a result of measuring strain at two or more points as measurement deformation distribution of the inspection target surface 50 of the wedge 34, acquired in step ST19 in FIG. 14, are inputted. Then, from the measurement result in step ST19 in FIG. 14, an estimation reaction force is estimated in step ST26 in FIG. 14. As shown in the relation between the reaction force and the deformation distribution of the inspection target surface 50 in FIG. 15, from the measurement position and the strain deformation value, and the deformation reaction force relation stored in the relation storage unit 228, a contact location between the core 31 and the wedge 34 where the strain position and value distribution is most matched is determined. Next, using the contact location as a boundary condition, the deformation reaction force relation between the reaction force and the deformation distribution of the inspection target surface 50 is selected from the relation storage unit 228, and the measurement result in step ST19 is inputted thereto, thereby estimating an estimation reaction force.

In the present embodiment 2, since dimensional tolerance between the wedge 34, and the core 31 and the spring 35 serving as a structure for supporting the wedge 34, is added, the distribution can be grasped by, for example, as shown in FIG. 12 in the above embodiment 1, performing measurement at the middle point XM (deformation value=YM) in the circumferential direction X which is a measurement position on the inspection target surface 50 of the wedge 34 where the strain change amount is maximum, and the two points XE1 (deformation value=YE1) and XE2 (deformation value=YE2) near the contact parts 300 with the core 31 which are ends of the strain distribution that can be measured. Further, positions shifted by the maximum value and the minimum value of the dimensional tolerance from the middle point XM in the circumferential direction X of the inspection target surface 50 are added as measurement points, whereby, even if the contact part between the core 31 and the wedge 34 is shifted, the maximum value of the change amount can be obtained, and thus the estimation reaction force can be estimated accurately.

In the inspection device and the inspection method for the rotating electrical machine according to embodiment 2 configured as described above, the same effects as in the above embodiment 1 are provided.

In addition, dimensional tolerance between the wedge and a structure for supporting the wedge when the rotating electrical machine is assembled is inputted to the input unit, and
- the deformation reaction force relation to be stored in the relation storage unit is acquired while being changed within the dimensional tolerance.

Meanwhile, in the input step, dimensional tolerance between the wedge and a structure for supporting the wedge when the rotating electrical machine is assembled is inputted, and in the relation storing step, the deformation reaction force relation to be stored is acquired while being changed within the dimensional tolerance.

Thus, looseness of the wedge can be judged considering the wedge and the structure for supporting the wedge, e.g., the core contact condition, whereby looseness judgement accuracy can be improved.

The measurement unit sets a measurement point so as to include a middle point in a circumferential direction on the inspection target surface of the wedge, in a case of measuring two or more points, a point closest to the core on the inspection target surface, and in a case of measuring three or more points, a point shifted in the circumferential direction from the middle point on the inspection target surface of the wedge by a maximum value or a minimum value of dimensional tolerance for a contact position between the wedge and the core when the rotating electrical machine is assembled, thereby performing measurement.

Thus, since a plurality of points on the wedge are set as measurement points, it is possible to efficiently inspect change in the reaction force by one measurement without needing plural times of measurement.

Embodiment 3

In the present embodiment 3, the content of processing of "estimating the looseness amount of the wedge 34" in step ST15 shown in FIG. 9 is different as compared to the inspection device 220 and the inspection method for the rotating electrical machine 100 described in the above embodiment 1. Therefore, only the different content of processing of "estimating the looseness amount of the wedge 34" will be described with reference to FIG. 16 and FIG. 17.

FIG. 16 is a flowchart showing the content of "processing of estimating the looseness amount of the wedge 34" in step ST15 shown in FIG. 9 in the above embodiment 1, according to the present embodiment 3. The corresponding similar processing is shown in FIG. 10 in the above embodiment 1. FIG. 17A shows the actual structure of the wedge 34, the spring 35, and the core 31 at the slot 33 shown in FIG. 4. FIG. 17B is a diagram obtained by modeling the structure shown in FIG. 17A. FIG. 17C is a graph showing a relation between a measurement position and a deformation amount of the inspection target surface 50 of the wedge 34 shown in FIG. 17A. FIG. 17D shows an expression representing a deformation reaction force relation in embodiment 3.

Next, difference from the content of processing of "estimating the looseness amount of the wedge 34 (step ST15)" shown in the above embodiment 1 will be mainly described with reference to FIG. 16 and FIG. 17. First, the deformation reaction force relation is acquired and stored as in step ST18 and step ST20 in FIG. 10 in embodiment 1. Next, as the measurement deformation distribution of the inspection target surface 50 of the wedge 34, strain at one or more points is measured a plurality of times and is inputted (step ST29 in FIG. 16).

Next, from the deformation reaction force relation stored in step ST20 and the measurement result in step ST29, a reaction force change amount is estimated as an estimation reaction force (step ST32 in FIG. 16). Specifically, the measurement in step ST29 is performed a plurality of times at certain time intervals, and a difference between the measured deformation amounts is calculated. As shown in FIG. 17C, a change amount $\Delta Y$ which is the difference in deformation of the inspection target surface 50 is calculated. Next, the change amount $\Delta Y$ and the deformation reaction force relation between the reaction force and the change amount $\Delta Y$ of deformation of the inspection target surface 50 stored in step ST20 are selected from the relation storage unit 228, and the change amount $\Delta Y$ is inputted to estimate a reaction force change amount $\Delta F$ as an estimation reaction force. In the subsequent process, judgement about whether proper or fault for the wedge 34, and the like, are performed on the basis of the reaction force change amount $\Delta F$ which is the estimation reaction force.

In the inspection device and the inspection method for the rotating electrical machine according to embodiment 3 configured as described above, the same effects as in the above embodiment 1 are provided.

In addition, the measurement unit measures the measurement deformation distribution of the inspection target surface of the wedge a plurality of times, and the estimation unit calculates a reaction force change amount as the estimation reaction force, from the deformation reaction force relation and a plurality of times of temporal changes in the measurement deformation distribution.

Meanwhile, in the measurement step, the measurement deformation distribution of the inspection target surface of the wedge is measured a plurality of times, and in the estimation step, a reaction force change amount is calculated as the estimation reaction force, from the deformation reaction force relation and a plurality of times of temporal changes in the measurement deformation distribution.

Thus, the number of measurement points on the inspection target surface of the wedge can be decreased, whereby the measurement time can be shortened.

Embodiment 4

In the present embodiment 4, the content of processing of "estimating the looseness amount of the wedge 34" in step ST15 shown in FIG. 9 is different as compared to the inspection device 220 and the inspection method for the rotating electrical machine 100 described in the above embodiment 1. Therefore, only the different content of processing of "estimating the looseness amount of the wedge 34" will be described with reference to FIG. 18 and FIG. 19. In addition, in the present embodiment 4, the deformation reaction force relation is acquired while being changed within the dimensional tolerance, as in the above embodiment 2.

Figure 18:
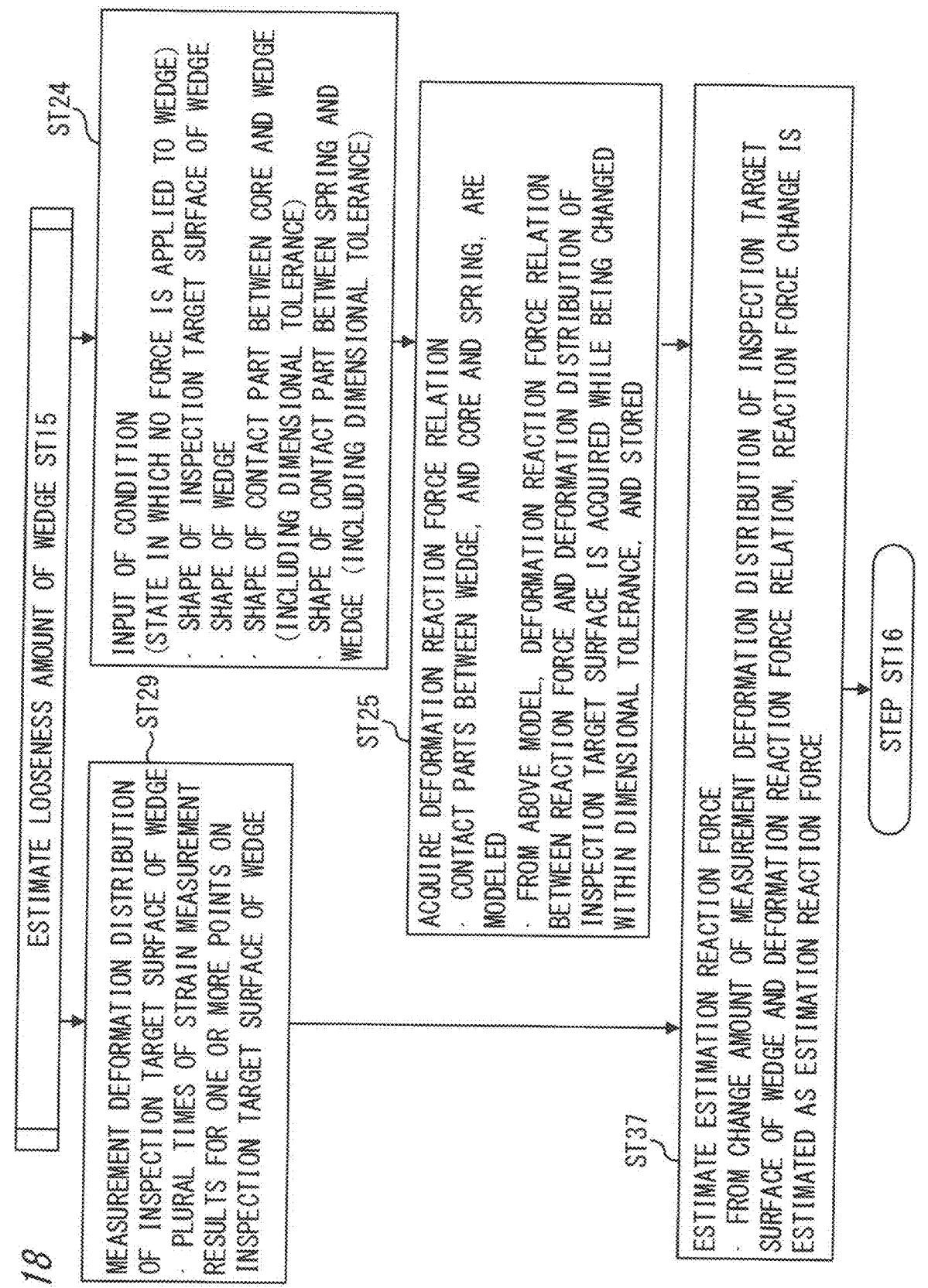
FIG. 18 is a flowchart showing an inspection method by an inspection device for a rotating electrical machine in embodiment 4.

FIG. 18 is a flowchart showing the content of "processing of estimating the looseness amount of the wedge 34" in step ST15 shown in FIG. 9 in the above embodiment 1, according to the present embodiment 4. The corresponding similar processing is shown in FIG. 10 in the above embodiment 1. FIG. 19A shows the actual structure of the wedge 34, the spring 35, and the core 31 at the slot 33 shown in FIG. 4. FIG. 19B is a diagram obtained by modeling the structure shown in FIG. 19A. FIG. 19C is a graph showing a relation between a measurement position and a deformation amount of the inspection target surface 50 of the wedge 34 shown in FIG. 19A. FIG. 19D shows an expression representing a deformation reaction force relation in embodiment 4.

Next, difference from the content of processing of "estimating the looseness amount of the wedge 34 (step ST15)" shown in the above embodiment 1 will be mainly described with reference to FIG. 18 and FIG. 19. First, as in step ST24 and step ST25 in FIG. 14 in embodiment 2, the deformation reaction force relation is acquired and stored in the relation storage unit 228. In addition, measurement is performed in the same manner as in step ST29 in embodiment 3.

Next, from the deformation reaction force relation stored in step ST25 and the measurement result in step ST29, an estimation reaction force is estimated (step ST37 in FIG. 18). First, the measurement in step ST29 is performed a plurality of times at certain time intervals, and a change amount which is the difference between the measured deformation amounts is calculated. Specifically, as shown in FIG. 19, a change amount ΔY which is the difference in the deformation amount of the inspection target surface 50 is calculated. As shown in the relation between the reaction force and deformation of the inspection target surface 50 in FIG. 19, a contact location between the core 31 and the wedge 34 where the measured strain position and the change amount ΔY, and the position and strain deformation amount stored in the relation storage unit 228, are matched, is determined. Next, using the contact location as a boundary condition, the relation between the reaction force and the change amount ΔY of deformation of the inspection target surface 50 is selected from the relation storage unit 228, and the measurement result in step ST29 is inputted thereto, thereby estimating an estimation reaction force.

In the inspection device and the inspection method for the rotating electrical machine according to embodiment 4 configured as described above, the same effects as in the above embodiment 1, etc., are provided.

In addition, the measurement unit measures the measurement deformation distribution of the inspection target surface of the wedge a plurality of times, and the estimation unit calculates a reaction force change amount as the estimation reaction force, from the deformation reaction force relation and a plurality of times of temporal changes in the measurement deformation distribution.

Meanwhile, in the measurement step, the measurement deformation distribution of the inspection target surface of the wedge is measured a plurality of times, and in the estimation step, a reaction force change amount is calculated as the estimation reaction force, from the deformation reaction force relation and a plurality of times of temporal changes in the measurement deformation distribution.

Thus, the number of measurement points on the inspection target surface of the wedge can be decreased, whereby the measurement time can be shortened.

Further, looseness of the wedge can be judged considering the wedge and the structure for supporting the wedge, e.g., the core contact condition, whereby looseness judgement accuracy can be improved.

Embodiment 5

Figure 20:
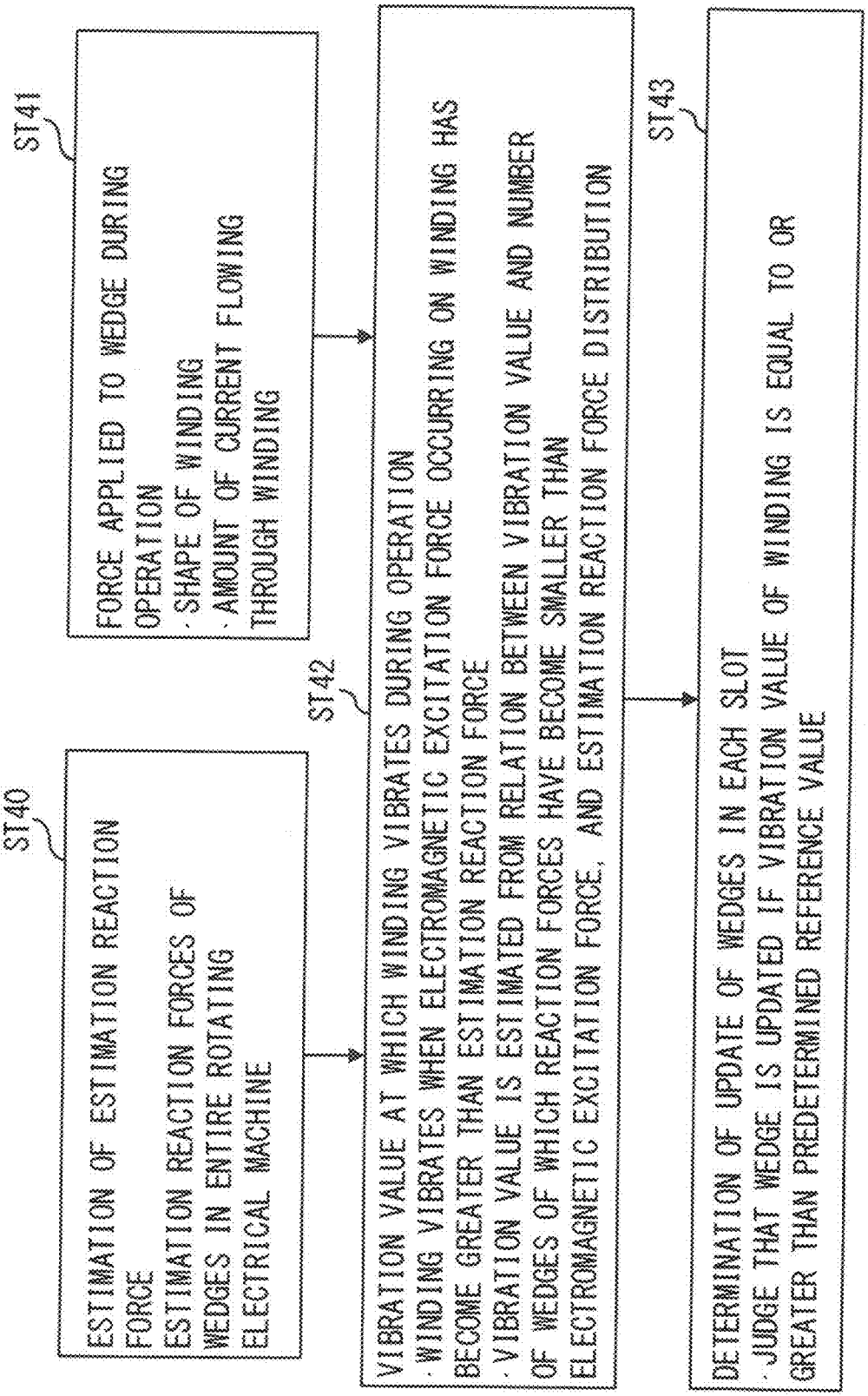
FIG. 20 is a flowchart showing an inspection method by an inspection device for a rotating electrical machine in embodiment 5.

In the present embodiment 5, the content of processing in the determination unit 231 shown in FIG. 7 is different as compared to the inspection device in embodiment 1. Only this difference will be described. FIG. 20 shows a flowchart of the inspection method for the rotating electrical machine according to embodiment 5.

Any of the estimation reaction forces obtained in the above embodiments is inputted (step ST40 in FIG. 20). Next, as a force applied to the wedge 34 during operation of the rotating electrical machine 100, the shape of the winding 36 and the amount of current flowing through the winding 36 are inputted (step ST41 in FIG. 20). Next, from the inputs in step 40 and step ST41, a vibration value of the winding 36 during operation of the rotating electrical machine 100 is estimated (step ST42 in FIG. 20). Specifically, an electromagnetic excitation force generated during operation of the rotating electrical machine 100 is estimated from the input in step ST41, and if the electromagnetic excitation force has become greater than the estimation reaction force inputted in step ST40, the winding 36 is judged to vibrate.

A relation between a vibration value and the number of wedges of which reaction forces have become smaller than the electromagnetic excitation force is calculated in advance through numerical analysis, and a vibration value of the winding 36 is estimated from distribution, in the core 31, of the estimation reaction forces of the wedges 34 that have been measured. Next, on the basis of the estimation result in step ST42, whether or not the vibration value is equal to or greater than a predetermined reference value for the vibration value of the winding 36, is judged. Update of the wedges 34 in the slot 33 for which the vibration value is estimated to be equal to or greater than the reference value, is determined (step ST43 in FIG. 20).

In the inspection device and the inspection method for the rotating electrical machine according to embodiment 5 configured as described above, the same effects as in the above embodiments are provided.

In addition, the method further includes a determination step of, from shape information about the stator and the winding of the rotating electrical machine, an external force applied to the wedge during operation of the rotating electrical machine, and the estimation reaction force, estimating a vibration value at which an entirety of the winding placed in the slot of the core vibrates during operation of the rotating electrical machine, to determine whether or not there is update of the wedge in the slot.

Thus, the wedge update location can be determined on a slot basis, whereby the wedge update time can be shortened.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 frame
100 rotating electrical machine
2 gas cooler
20 measurement unit
210A imaging device
210B imaging device 211A driving device
211B driving device
220 inspection device
221 control unit
222 acquisition unit
223 first storage unit
224 generation unit
225 inspection unit
226 second storage unit
227 input unit
228 relation storage unit
229 estimation unit
230 judgement unit
231 determination unit
240 display device
3 stator
31 core
32A coil end portion
33 slot
34 wedge
35 spring
36 winding
37 conductor
38 insulation portion
4 rotor
41 rotary shaft
42 rotor core
43A retention ring
43B retention ring
50 inspection target surface
X circumferential direction
Y radial direction
YO outer side
YI inner side
Z axial direction

The invention claimed is:

1. An inspection device for inspecting a rotating electrical machine including a stator having a wedge for fixing a winding, either with a spring interposed between the wedge and the winding, or by having a spring function, the winding being placed in a slot formed on an inner side in a radial direction of an annular core of the stator, and a rotor provided on an inner side in the radial direction of the stator with a predetermined interval therebetween, the inspection device comprising:
 a receiver configured to input shape data indicating a shape of an inspection target surface of the wedge exposed from the slot in a state in which no force is applied to the wedge;
 a processor and memory configured as a relation storage which acquires and stores, as a deformation reaction force relation, a relation between a reaction force of the spring or the wedge at the inspection target surface of the wedge and deformation distribution from the shape of the inspection target surface of the wedge inputted to the receiver;
 the processor and memory further configured to measure measurement deformation distribution of the inspection target surface of the wedge;
 the processor and memory further configured to estimate an estimation reaction force from the measurement deformation distribution and the deformation reaction force relation; and
 the processor and memory further configured to judge whether a looseness of the wedge is either proper or indicates a fault on the basis of the estimation reaction force.

2. The inspection device for the rotating electrical machine according to claim 1, wherein
 dimensional tolerance between the wedge and a portion of the stator for supporting the wedge when the rotating electrical machine is assembled is inputted to the receiver, and
 the deformation reaction force relation to be stored in the relation storage is acquired while being changed within the dimensional tolerance.

3. The inspection device for the rotating electrical machine according to claim 2, wherein
 the processor and memory further configured to measure the measurement deformation distribution of the inspection target surface of the wedge a plurality of times, and
 the processor and memory further configured to calculate a reaction force change amount as the estimation reaction force, from the deformation reaction force relation and a plurality of times of temporal changes in the measurement deformation distribution.

4. The inspection device for the rotating electrical machine according to claim 3, wherein
 the processor and memory further configured to set a first measurement point so as to include a middle point in a circumferential direction on the inspection target surface of the wedge,
 the processor and memory further configured to set a second measurement point closest to the core on the inspection target surface, in a case of measuring two or more points, and
 the processor and memory further configured to set a third measurement point shifted in the circumferential direction from the middle point on the inspection target surface of the wedge by a maximum value or a minimum value of dimensional tolerance for a contact position between the wedge and the core, in a case of measuring three or more points, when the rotating electrical machine is assembled.

5. The inspection device for the rotating electrical machine according to claim 3, wherein
 each of the deformation distribution and the measurement deformation distribution of the inspection target surface of the wedge is distribution of any of strain, displacement, or an angle of the inspection target surface.

6. The inspection device for the rotating electrical machine according to claim 2, wherein
 the processor and memory further configured to set a first measurement point so as to include a middle point in a circumferential direction on the inspection target surface of the wedge,
 the processor and memory further configured to set a second measurement point closest to the core on the inspection target surface, in a case of measuring two or more points, and
 the processor and memory further configured to set a third measurement point shifted in the circumferential direction from the middle point on the inspection target surface of the wedge by a maximum value or a minimum value of dimensional tolerance for a contact position between the wedge and the core, in a case of measuring three or more points, when the rotating electrical machine is assembled.

7. The inspection device for the rotating electrical machine according to claim 2, wherein
 each of the deformation distribution and the measurement deformation distribution of the inspection target surface of the wedge is distribution of any of strain, displacement, or an angle of the inspection target surface.

8. The inspection device for the rotating electrical machine according to claim 1, wherein
the processor and memory further configured to measure the measurement deformation distribution of the inspection target surface of the wedge a plurality of times, and
the processor and memory further configured to calculate a reaction force change amount as the estimation reaction force, from the deformation reaction force relation and a plurality of times of temporal changes in the measurement deformation distribution.

9. The inspection device for the rotating electrical machine according to claim 8, wherein
the processor and memory further configured to set a first measurement point so as to include a middle point in a circumferential direction on the inspection target surface of the wedge,
the processor and memory further configured to set a second measurement point closest to the core on the inspection target surface, in a case of measuring two or more points, and
the processor and memory further configured to set a third measurement point shifted in the circumferential direction from the middle point on the inspection target surface of the wedge by a maximum value or a minimum value of dimensional tolerance for a contact position between the wedge and the core, in a case of measuring three or more points, when the rotating electrical machine is assembled.

10. The inspection device for the rotating electrical machine according to claim 8, wherein
each of the deformation distribution and the measurement deformation distribution of the inspection target surface of the wedge is distribution of any of strain, displacement, or an angle of the inspection target surface.

11. The inspection device for the rotating electrical machine according to claim 1, wherein
the processor and memory further configured to set a first measurement point so as to include a middle point in a circumferential direction on the inspection target surface of the wedge,
the processor and memory further configured to set a second measurement point closest to the core on the inspection target surface in a case of measuring two or more points, and
the processor and memory further configured to set a third measurement point shifted in the circumferential direction from the middle point on the inspection target surface of the wedge by a maximum value or a minimum value of dimensional tolerance for a contact position between the wedge and the core, in a case of measuring three or more points, when the rotating electrical machine is assembled.

12. The inspection device for the rotating electrical machine according to claim 1, wherein
each of the deformation distribution and the measurement deformation distribution of the inspection target surface of the wedge is distribution of any of strain, displacement, or an angle of the inspection target surface.

13. An inspection method for inspecting a rotating electrical machine including a stator having a wedge for fixing a winding, either with a spring interposed between the wedge and the winding, or by having a spring function, the winding being placed in a slot formed on an inner side in a radial direction of an annular core of the stator, and a rotor provided on an inner side in the radial direction of the stator with a predetermined interval therebetween, the inspection method comprising:
an input step of inputting a shape data indicating a shape of an inspection target surface of the wedge exposed from the slot in a state in which no force is applied to the wedge;
a relation storing step of acquiring and storing, as a deformation reaction force relation, a relation between a reaction force of the spring or the wedge at the inspection target surface of the wedge and deformation distribution from the shape data indicating the shape of the inspection target surface of the wedge inputted in the input step;
a measurement step of measuring measurement deformation distribution of the inspection target surface of the wedge; and
an estimation step of estimating an estimation reaction force from the measurement deformation distribution and the deformation reaction force relation.

14. The inspection method for the rotating electrical machine according to claim 13, wherein
in the input step, dimensional tolerance between the wedge and a portion of the stator for supporting the wedge when the rotating electrical machine is assembled is inputted, and
in the relation storing step, the deformation reaction force relation to be stored is acquired while being changed within the dimensional tolerance.

15. The inspection method for the rotating electrical machine according to claim 14, wherein
in the measurement step, the measurement deformation distribution of the inspection target surface of the wedge is measured a plurality of times, and
in the estimation step, a reaction force change amount is calculated as the estimation reaction force, from the deformation reaction force relation and a plurality of times of temporal changes in the measurement deformation distribution.

16. The inspection method for the rotating electrical machine according to claim 14, further comprising a judgement step of judging whether proper or fault about looseness of the wedge on the basis of the estimation reaction force.

17. The inspection method for the rotating electrical machine according to claim 13, wherein
in the measurement step, the measurement deformation distribution of the inspection target surface of the wedge is measured a plurality of times, and
in the estimation step, a reaction force change amount is calculated as the estimation reaction force, from the deformation reaction force relation and a plurality of times of temporal changes in the measurement deformation distribution.

18. The inspection method for the rotating electrical machine according to claim 17, further comprising a judgement step of judging whether proper or fault about looseness of the wedge on the basis of the estimation reaction force.

19. The inspection method for the rotating electrical machine according to claim 13, further comprising a judgement step of judging whether proper or fault about looseness of the wedge on the basis of the estimation reaction force.

20. The inspection method for the rotating electrical machine according to claim 13, further comprising a determination step of, from shape information about the stator and the winding of the rotating electrical machine, an external force applied to the wedge during operation of the rotating electrical machine, and the estimation reaction force, estimating a vibration value at which an entirety of the winding placed in the slot of the core vibrates during operation of the rotating electrical machine, to determine whether or not there is update of the wedge in the slot.

* * * * *